United States Patent
Karpinsky et al.

(10) Patent No.: US 8,181,592 B2
(45) Date of Patent: May 22, 2012

(54) APPARATUS FOR APPLYING COATING TO PRODUCTS AND METHODS OF USE THEREOF

(75) Inventors: James Karpinsky, Poynette, WI (US); James Bakos, Poynette, WI (US); Scott Rose, Columbus, WI (US); Travis Renkly, Volga, SD (US)

(73) Assignee: Vibratory Solutions, LLC, Lodi, WI (US)

( * ) Notice: Subject to any disclaimer, the term of this patent is extended or adjusted under 35 U.S.C. 154(b) by 747 days.

(21) Appl. No.: 12/271,632

(22) Filed: Nov. 14, 2008

(65) Prior Publication Data
US 2009/0123616 A1 May 14, 2009

Related U.S. Application Data

(63) Continuation-in-part of application No. 12/126,610, filed on May 23, 2008, now Pat. No. 7,757,836, which is a continuation-in-part of application No. 11/396,202, filed on Mar. 30, 2006, now Pat. No. 7,703,411.

(60) Provisional application No. 60/940,247, filed on May 25, 2007, provisional application No. 61/083,777, filed on Jul. 25, 2008, provisional application No. 60/990,566, filed on Nov. 27, 2007, provisional application No. 60/667,405, filed on Apr. 1, 2005.

(51) Int. Cl.
*B05C 3/09* (2006.01)

(52) U.S. Cl. ........... 118/13; 118/19; 118/22; 118/24; 118/417; 118/57; 99/494; 99/450.1

(58) Field of Classification Search .......... 118/13, 118/19, 22, 24, 417, 57; 99/494, 450.1; 426/289; 427/242
See application file for complete search history.

(56) References Cited

U.S. PATENT DOCUMENTS

| | | | |
|---|---|---|---|
| 580,644 A | 4/1897 | Ham | |
| 2,659,338 A | 11/1953 | Harrison | |
| 3,245,518 A | 4/1966 | Reibel et al. | |
| 3,640,767 A * | 2/1972 | Fulton et al. | 427/127 |
| 3,707,769 A | 1/1973 | Syrjanen et al. | |
| 4,214,548 A * | 7/1980 | Booth et al. | 118/18 |
| 4,248,173 A | 2/1981 | Kuhlman | |
| 4,313,535 A | 2/1982 | Carmichael | |

(Continued)

OTHER PUBLICATIONS

Non-final office action mailed May 28, 2009 for U.S. Appl. No. 11/396,202, filed Mar. 30, 2006.

(Continued)

*Primary Examiner* — Laura Edwards
(74) *Attorney, Agent, or Firm* — Whyte Hirschboeck Dudek S.C.

(57) ABSTRACT

An apparatus and method for coating products is disclosed herein. An exemplary apparatus comprises a vibration generating portion and a product coating portion. The product coating portion can include a coating application portion, a sifting portion, and an aligning portion. The exemplary apparatus can include a coating recycle portion as well. The vibration generation portion further comprises a motor vibration assembly secured to a frame wherein the frame is in communication with the product coating portion, such as a pan assembly, by springs that move the pan assembly with a vibratory motion. The product coating portion includes a series of angled steps that guide the coating and vibrating product upwards and forward, while simultaneously allowing the product to be agitated against the coating resting on the step surface. Additionally, the product coating portion can include a moveable wire belt conveyor assembly.

15 Claims, 20 Drawing Sheets

U.S. PATENT DOCUMENTS

| | | | |
|---|---|---|---|
| 4,889,241 A | 12/1989 | Cogan et al. | |
| 4,936,248 A | 6/1990 | Miller | |
| 5,052,330 A | 10/1991 | Stacy | |
| 5,150,798 A | 9/1992 | Mills, Jr. | |
| 5,238,303 A | 8/1993 | Dixon | |
| 5,238,493 A | 8/1993 | Miller | |
| 5,267,672 A | 12/1993 | Jacobsen et al. | |
| 5,437,723 A * | 8/1995 | Sollich | 118/21 |
| 5,555,967 A | 9/1996 | Hufford | |
| 5,643,361 A | 7/1997 | Wadell | |
| 5,728,216 A | 3/1998 | London | |
| 5,762,176 A | 6/1998 | Patterson et al. | |
| 5,868,241 A | 2/1999 | Pellegrino | |
| 5,908,117 A | 6/1999 | Stroman et al. | |
| 5,937,744 A | 8/1999 | Nothum, Sr. et al. | |
| 6,000,320 A | 12/1999 | Herrick, IV | |
| 6,019,216 A | 2/2000 | Patterson | |
| 6,079,550 A | 6/2000 | Gilman | |
| 6,079,698 A | 6/2000 | Patterson et al. | |
| 6,117,235 A | 9/2000 | Toccaceli et al. | |
| 6,142,292 A | 11/2000 | Patterson | |
| 6,161,680 A | 12/2000 | Martin et al. | |
| 6,179,117 B1 | 1/2001 | Gilamn | |
| D443,501 S | 6/2001 | Sleppy | |
| 6,250,471 B1 | 6/2001 | Ruthve et al. | |
| 6,253,908 B1 | 7/2001 | Gilman | |
| 6,279,731 B1 | 8/2001 | Anderson | |
| 6,286,658 B1 | 9/2001 | Hufford | |
| 6,308,822 B1 | 10/2001 | Moran et al. | |
| 6,325,202 B1 | 12/2001 | Gaines | |
| 6,415,913 B2 | 7/2002 | Sleppy et al. | |
| 6,457,577 B1 | 10/2002 | Ikeda et al. | |
| 6,460,680 B1 | 10/2002 | Hufford | |
| 6,486,481 B1 | 11/2002 | Tigera | |
| 6,631,799 B2 | 10/2003 | Samson | |
| 6,655,523 B2 | 12/2003 | Jones et al. | |
| 6,659,267 B2 | 12/2003 | Patterson | |
| 6,705,459 B1 | 3/2004 | Musschoot | |
| 6,834,756 B2 | 12/2004 | Sullivan, Jr. | |
| 6,868,960 B2 | 3/2005 | Jones | |
| 6,962,128 B2 | 11/2005 | Dove et al. | |
| 7,174,846 B2 | 2/2007 | Zeegers et al. | |
| 7,827,929 B2 | 11/2010 | Garrison et al. | |
| 2001/0051538 A1 | 12/2001 | Suzuki et al. | |
| 2003/0041746 A1 | 3/2003 | Schmidt | |
| 2006/0156931 A1 | 7/2006 | Mather et al. | |

OTHER PUBLICATIONS

Robins Vibro Batter and Breading Machine, Robins Food Processing Machinery, A.K. Robins and Company, Incorporated, p. 230.

MP Equipment Company, Brochure, "MP Drum Breader"; http://www.mpequipment.com/products/breader_drum.html.

Meyer + Garroutte Systems, Brochure, Garroutte Closed Pocket Elevator, "Unique Conveyor Meters Product with No Spilling,"; www.meyer-industries.com.

Marchant Schmidt, Inc. Products>Products Topping Applicators. "Topping Applicator"; http://www.marchantschmidt.com/item_detail.php?id-64, (Mar. 2007).

Stein Associates, Inc., Brochure, "XL Breading Machine" SP-0471-986, (Aug. 1993).

Composiflex, Brochure, "Composite Springs"; www.composiflex.com.

P.J. Prause Durotec GmbH, Brochure, "Fatigue strength of S-PLY leaf springs".

Renold Ajax, Brochure, "Rotart Electric Vibrators".

Volta Belting Technology Ltd., Brochure, "SuperDrive, The Hygienic Positive-Drive Belt", (Sep. 2003).

Intralox, Brochure, "Series 800".

"A composite housing with integrated performance features".

"How to select the right overhung load adaptors".

Flat-Flex, Brochure, "Mesh guide".

Eaton, Brochure, "Low speed high torque motors", Aug. 2006.

Notice of Allowance mailed Dec. 16, 2009, for U.S. Appl. No. 11/396,202, filed Mar. 30, 2006.

Ex Parte Quayle Office Action mailed on Dec. 4, 2009, for U.S. Appl. No. 12/126,610, filed May 23, 2008.

* cited by examiner

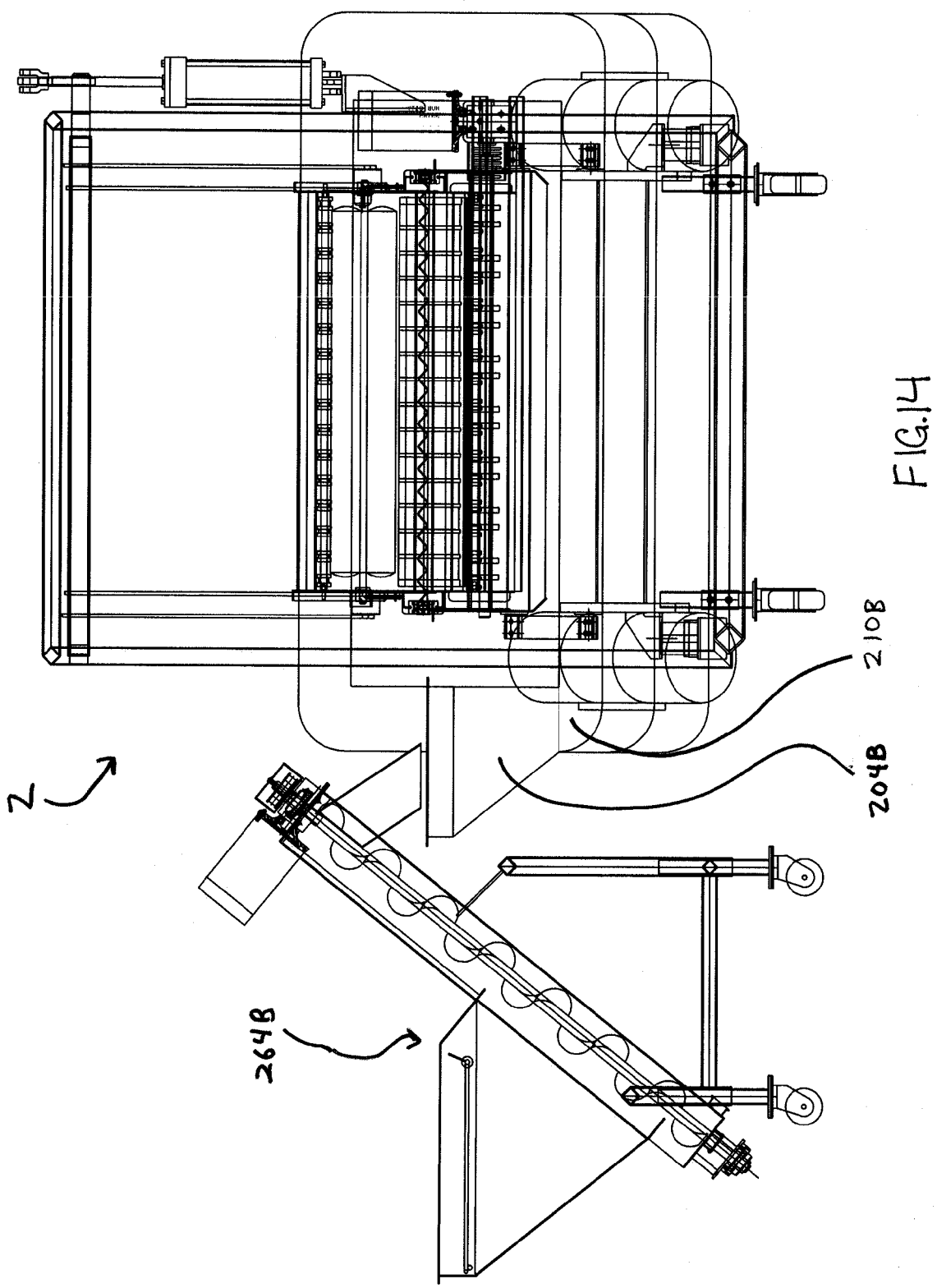

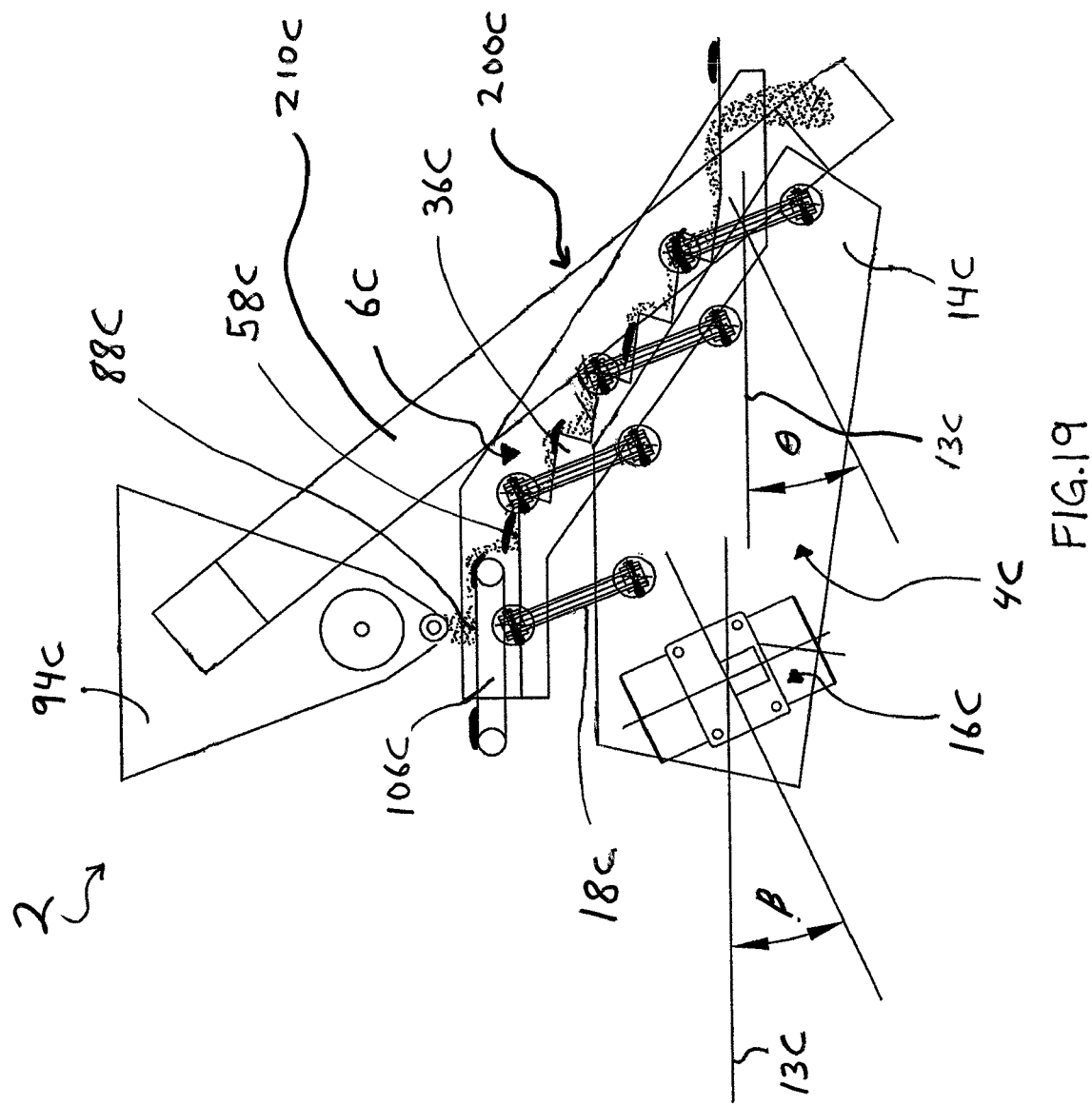

APPARATUS FOR APPLYING COATING TO PRODUCTS AND METHODS OF USE THEREOF

CROSS-REFERENCE TO RELATED APPLICATIONS

This application is a continuation-in-part application of U.S. application Ser. No. 12/126,610 filed on May 23, 2008, issued as U.S. Pat. No. 7,757,836, and claiming priority to U.S. Provisional Application Ser. No. 60/940,247 filed on May 25, 2007. The Ser. No. 12/126,610 application is further a continuation-in-part application of U.S. application Ser. No. 11/396,202 filed on Mar. 30, 2006, issued as U.S. Pat. No. 7,703,411, and claiming priority to U.S. Provisional Application Ser. No. 60/667,405 filed on Apr. 1, 2005. This application also claims priority to U.S. Provisional Application No. 61/083,777 filed on Jul. 25, 2008 and U.S. Provisional Application Ser. No. 60/990,566 filed on Nov. 27, 2007.

FIELD OF THE INVENTION

The field of invention includes coating and conveying equipment.

BACKGROUND OF THE INVENTION

Prepared food products come in a wide variety of styles. Many prepared food products, whether ready-to-eat or those needing further cooking, are prepared with a coating that makes the food product more appealing. Such prepared food products include entrees, appetizers, desserts (such as pastries, donuts), etc., and includes meats, cheese, fruit and vegetables, etc. The types of coatings used on these food products include dry coatings such as flour, bread crumbs, corn meal, sugar and spice and the like.

In the food preparation industry, food coatings are generally classified by appearance as flour breading, free flowing (such as cracker meal or bread crumbs), and Japanese-style crumbs which tend to be elongate and crispy. Food coatings may also include seasonings, spices, shortening, etc., as needed to add flavor and texture to the food product. Other coatings such as ground cereal, dried vegetables or the like, may also be employed.

Each coating mixture has inherent characteristics that present challenges to machinery used to automatically and mechanically coat food products. For example, flour mixtures, which consist of finely ground dust-like particles, have a tendency to pack under pressure, thereby decreasing the free-flow properties of the coating mixture around the food product, which can decrease coating uniformity. Similarly, coating mixtures recognized as free-flowing include reasonably hard and roughly spherical particles ranging in size from dust to larger particles, such as cornmeal, cracker meal or the like. Free-flowing mixtures in automated coating processes can often flow or leak out of the machinery.

Japanese-style crumbs have no uniform shape, are very delicate, and are crystalline-like in nature and appearance. So, the coating machine should be able to properly handle this type of breading material to avoid degradation of the quality and particle sizes thereof. Japanese-style crumbs consist of modified wheat flour with small percentages of yeast, salt, sugar, vegetable oil and other additives. The Japanese-style crumbs appear to be dried shredded white bread having particles ranging in size from as large as ½ inch to as small as flour size particles.

Some food products have a batter applied to them before the coating or topping is applied. When a batter applicator is used before the coating or topping is applied, time is saved when both the batter applicator and the coating or topping run at the same or similar speed and when both have the same or substantially similar product output width. This provides a continuous flow of food product during both processes. These attributes are also helpful in non-batter applications, such as going from a breading application to a frying application.

While the automation of the food coating process is economically desirable, another goal of the food coating process is to make the coating appear to be "home-made." However, most automatic food coating processes fail to make "home-style" appearing foods. In the commercial production of prepared foods, a large variety of food products are machine-coated with breading, flour or the like before being fried, (or otherwise cooked) or simply frozen and packaged.

Some food products have what is called a "home-style breading," which simulates a breaded food product prepared in the home. This can be done, for example, by dipping food, such as pieces of raw chicken, in a bowl with beaten egg and then placing the egg coated food into a bag containing flour and optionally spices, herbs, seasonings, shortening, etc., to form a coating which adds flavor and texture to the product. Other coating material such as ground cereal, dried vegetables or the like may be used as desired. The bag is moved back and forth to coat the many surfaces of the food product. This technique can be useful for coating food products having many, oftentimes hidden surfaces, such as chicken, because in moving the bag, the surfaces of the food products are exposed to the coating. The technique is also useful for coating various other food products. The flour coated food is then fried in a frying pan or deep fryer in the home.

Generally, the food industry prefers to use an automated and continuous food coating process wherever possible while still achieving a "home-style" look. In the food processing industry, home-style breading food products have been prepared using a drum type breading apparatus, wherein a food coating, such as flour, is added to a hollow drum with axial ribs along inner surfaces of the drum. The food products to be coated are added to the drum via a first conveyor that drops food products into the drum. The drum rotates so that the food products are tumbled along with the coating. The tumbling process unfolds food products that are folded and exposes surfaces of the food products to the coating. Although producing a desired coating appearance and texture, particular problems encountered in a drum breader include the food products being collected in a pile at the bottom of the drum. The pile of coated food products is deposited on the center of a second conveyor belt that takes food products away from the drum. Therefore, food exiting on the second conveyor belt must be spread and aligned along the width of the conveyor belt before it goes to another operation, such as freezing. This adds another step to the processing of food products. It also can result in low quality food products if food is not properly redistributed along the conveyor width. For example, food can be clumped together and then the next step in the food processing is not carried out in an optimal way. Where food is frozen after being on the second conveyor, clumps of food can be frozen together, making weighing, cooking, and packaging of it very difficult and oftentimes resulting in costly waste. In addition, drum style breaders are often difficult to clean and require intensive maintenance.

The use of a drum breader has many disadvantages, particularly when used on a high capacity manufacturing line. The first disadvantage is that the product is discharged from a drum breader in a narrow pile and must be then spread back out to the typical line width which can be 3-4 times the pile width. This process is often done with an additional piece of equipment placed after the drum breader. Additionally, many processors also like to align and lengthen food products such as a chicken strip before they go into a fryer or freezer to maximize the line capacity and also provide a more visually appealing product. This task is also accomplished using an additional piece of equipment placed after the drum breader.

Further, the drum breader is not very effective at sifting flour that has not adhered to the food product. Because of this, excess coating is often discharged from the drum breader along with the food product where it either falls to the floor causing waste or is carried down stream causing problems with further processes such as ruining the oil in a fryer. Additionally, due to the size of the drum breader and because of the ancillary equipment that is often needed to spread and align the product after it, home style lines can get very long and therefore can be difficult to accommodate.

Other types of food coating devices employ endless mesh belts. For example, U.S. Pat. No. 6,117,235 discloses a continuous coating and breading apparatus which includes a conveyor belt made of stainless steel mesh. The conveyor has various stations along its length. Food items are deposited on the belt at an infeed area and are coated with the coating mixture on the bottom surface. The conveyor belt carries the food items under a "waterfall" of food coating that covers the top surface of the food items. The conveyor passes under one or more pressure rolls that pat the coating mixture onto the food pieces, and/or a blow off device, removing excess coating. The coated food product is deposited at a discharge area. In commercial practice, such systems may employ as many as six conveyors to spread the coating mixture and achieve acceptable consistent operation and performance. Further, as it is customary to use a drum breader for applying a coating to durable food products that require agitation to fully coat, such as chicken, and a mesh conveyor belt to apply coating to fragile food products, at least two machines are required. The use of two machines requires extra space and extra maintenance.

BRIEF DESCRIPTION OF DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. The drawings illustrate a best mode presently contemplated for carrying out the invention. In addition, although not used exclusively, when used, like numerals have been used to identify like components throughout. In the drawings:

FIG. 14 depicts the exemplary, vibratory frame assembly, pan assembly, coating recycle assembly and auxiliary hopper.

FIG. 19 is a side view of an exemplary embodiment of the apparatus for applying coating to food products including, the vibratory frame assembly, the pan assembly, and the coating recycle assembly.

DETAILED DESCRIPTION

Figure 1:
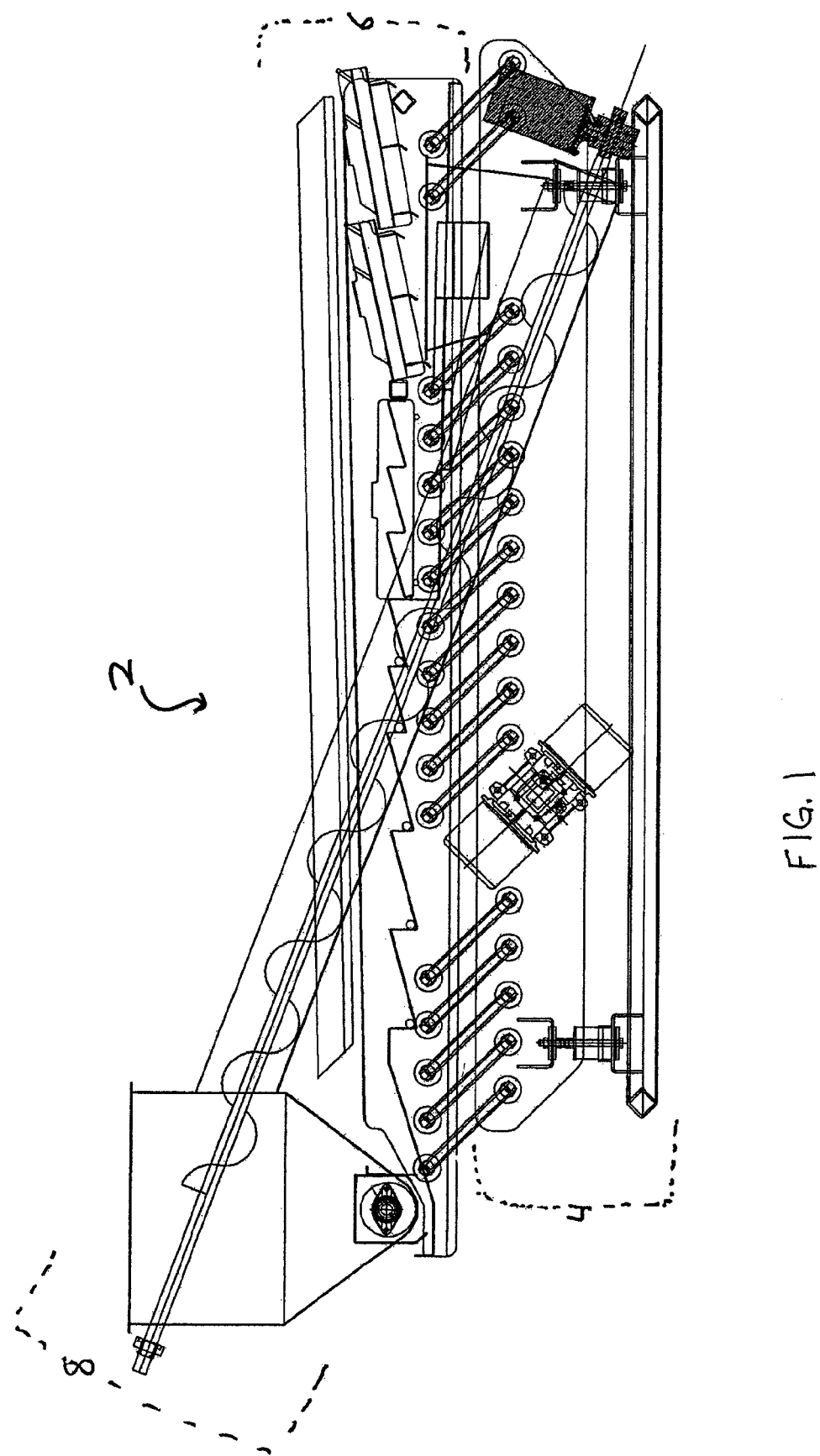
FIG. 1 is a right side view of an exemplary embodiment of an apparatus for applying coating to food products including, a vibratory frame assembly, a pan assembly, and a coating recycle assembly.

In summary, an apparatus and method for coating products is disclosed herein. An exemplary apparatus comprises a vibration generating portion and a food product coating portion. The food product coating portion can include a coating application portion, a sifting portion, and an aligning portion. The exemplary apparatus can include a coating recycle portion as well. The vibration generation portion further comprises a motor vibration assembly secured to a frame wherein the frame is in communication with the food product coating portion, such as a pan assembly, by springs that move the pan assembly with a vibratory motion. The pan assembly includes at least one of the coating application portion, the sifting portion, and the aligning portion. The coating application portion is comprised of a series of inclinations, such as angled steps that guide the coating and vibrating food product upwards and forwardly while simultaneously allowing the food product to be bounced against the coating resting on the step surface. As the food product is vibrated over the edge of one or more steps, it tumbles and unfolds, thereby exposing non-coated portions to the coating.

The sifting portion succeeds the coating portion wherein the food product continues to vibrate across another series of angled steps of which perforations are formed therein. Unused or otherwise excessive coating on the food product passes through the perforations as the food product vibrates forward across the steps. The coating that passes through the perforations can be collected and guided into a hopper and/or a base recycle conveyor that conveys the coating back to the coating portion step(s).

The food product continues to the aligning portion that is comprised of a corrugated surface situated at an incline having channels formed by the corrugations that are substantially parallel with the length of the pan assembly from an intake end to a discharge end. The channels bias the food product such that it can be elongated and aligned from the vibration.

An additional sifting portion can be provided that can include another aligning portion having holes situated therethrough to allow agglomerations of coating or undesirably small food product pieces to pass through and thereby be removed from the process. The coated, elongated, and substantially aligned food product can then advance to a subsequent process.

Further, another embodiment of the apparatus and method for coating food products is disclosed herein, wherein the recycle conveyor portion includes a base recycle conveyor and a waterfall recycle conveyor that supplies coating at an intake end of the coating application portion and receives coating at the discharge end of the pan assembly.

Additionally, another embodiment of the apparatus and method for coating food products is disclosed herein, the apparatus comprising a vibration generating portion, a food product coating portion and a recycle conveyor portion. The vibration generating portion includes a motor-induced vibration assembly. The food product coating portion can include a pan assembly in communication with the vibration generating portion, and at least one of a food product path therealong the pan assembly, and a food product path along a wire conveyor belt assembly that is not subject to the vibratory component of the vibration generating portion. The recycle conveyor portion can include one or more recycle conveyors, such as a base recycle conveyor to provide coating to a loading surface and/or a waterfall recycle conveyor situated to provide a waterfall of coating to at least one of a bottom and top portion of a food product. The recycle conveyor(s) is configured to receive coating at a distal end of the food product path and return it to the proximal end of the food path. Further, the apparatus can include a swing frame portion that is secured to the wire conveyor belt assembly such that the wire conveyor belt assembly can be moved from a non-production position, wherein the food product path is along the pan assembly, and a production position, wherein the food product path is along the wire conveyor belt assembly. Additionally, the apparatus is not limited to the application of food based coating and food products, the apparatus can be used to provide a coating of non-food based material onto a non-food based object.

Figure 2:
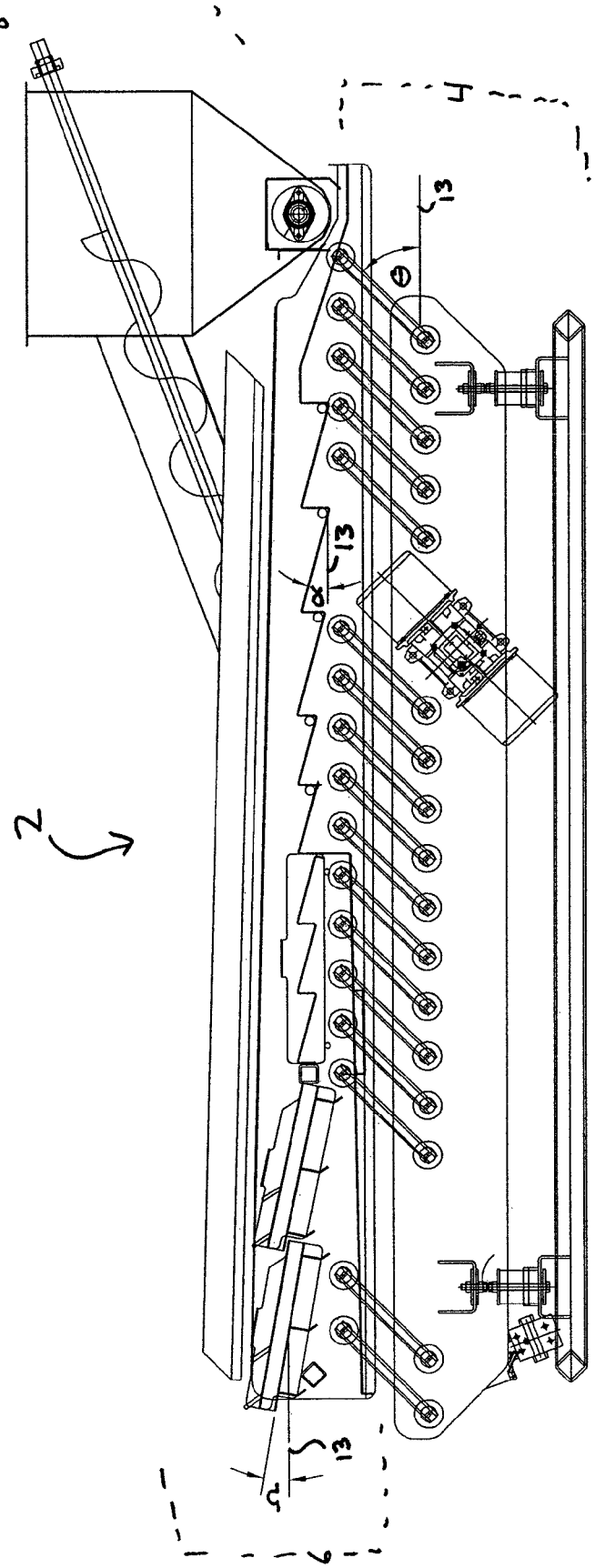
FIG. 2 is a left side view of the apparatus for applying coating to food products of FIG. 1.
Figure 3:
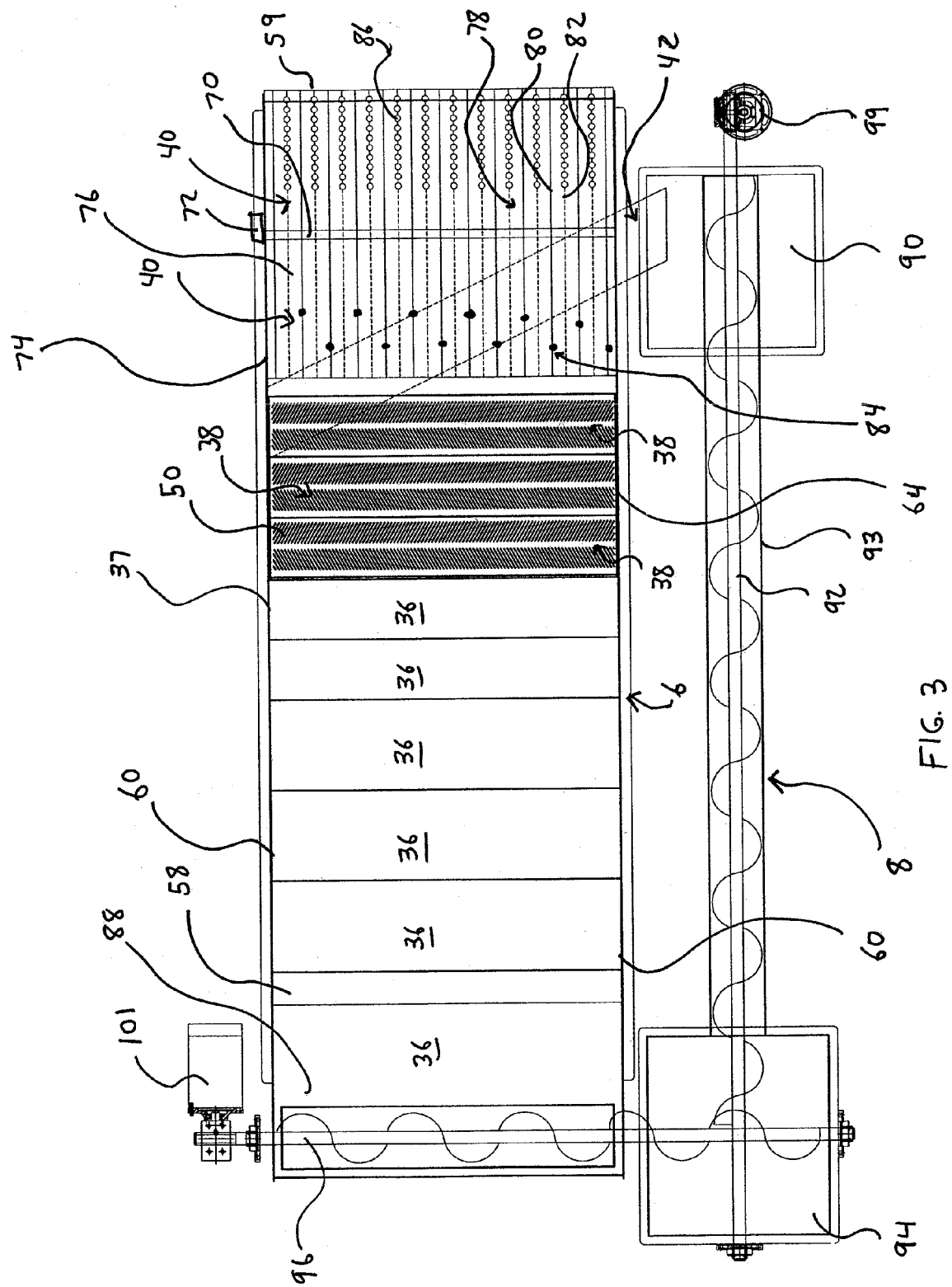
FIG. 3 is a top view of the apparatus for applying coating to food products of FIG. 1.
Figure 4:
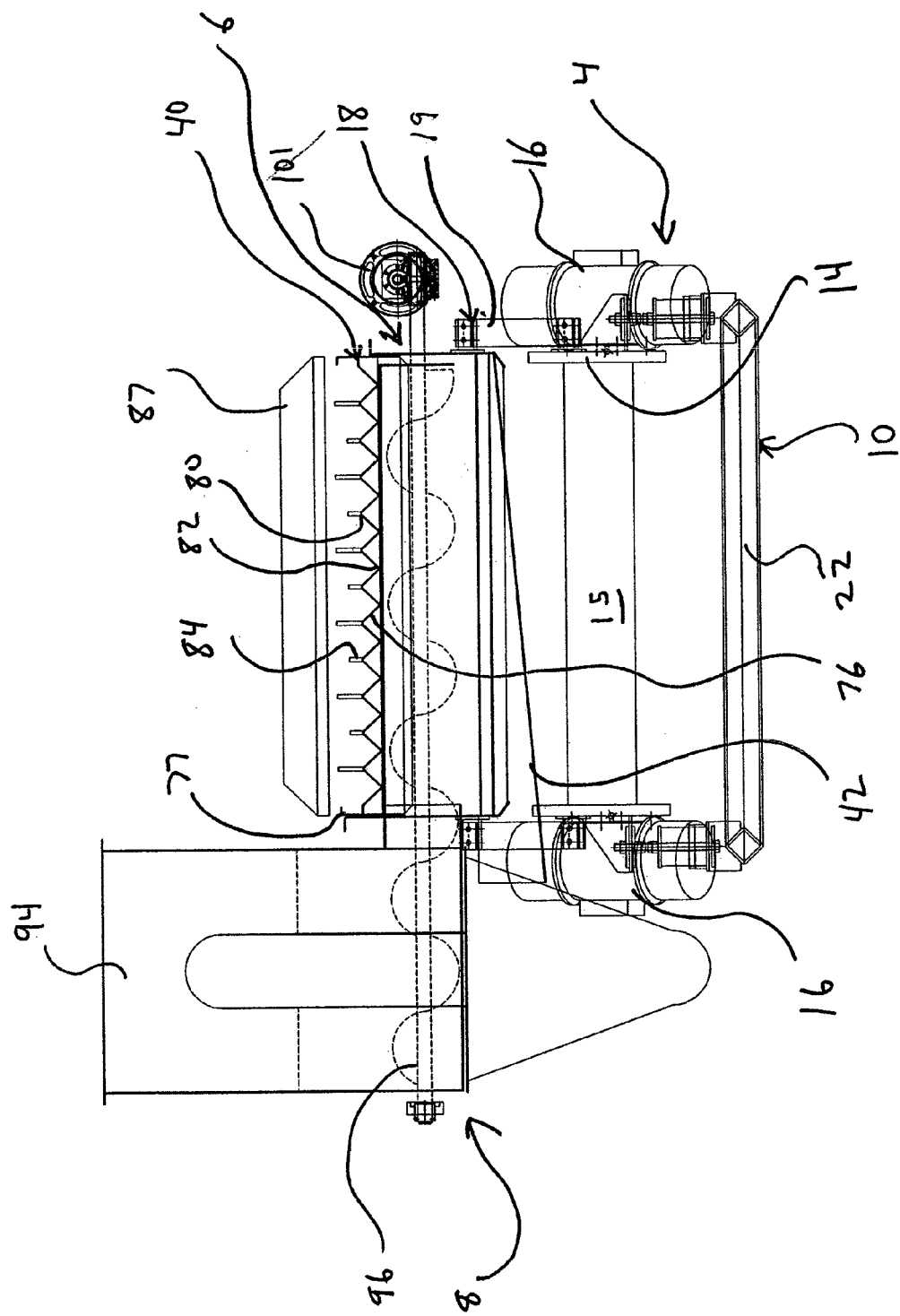
FIG. 4 is a discharge end view of the apparatus for applying coating to food products of FIG. 1.

FIGS. 1 and 2 depict an exemplary embodiment of an apparatus 2 for applying coating to food products, the apparatus 2 includes a vibration generating portion, such as a vibratory frame assembly 4, a food product coating portion, such as a pan assembly 6, and a coating recycle portion, such as coating recycle assembly 8. Additionally, FIG. 1 depicts a left side of the apparatus 2, and FIG. 2 depicts a right side of the apparatus 2. Further, FIG. 3 shows a top view of the apparatus 2, more particularly, the pan assembly 6 and the coating recycle assembly 8. FIG. 4 shows a discharge end view of the apparatus 2 including portions of the vibratory frame assembly 4, the pan assembly 6, and the coating recycle assembly 8.

Figure 5:
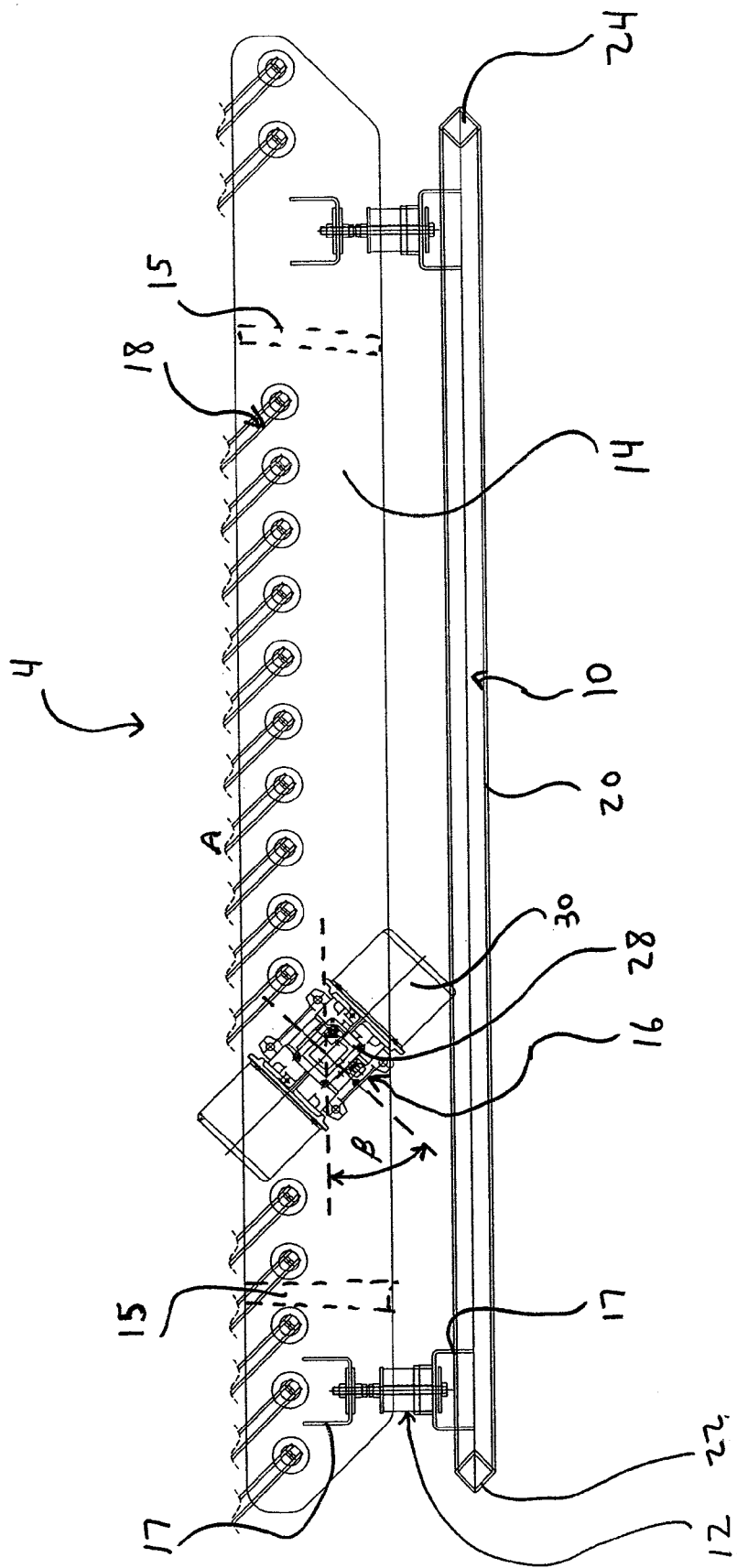
FIG. 5 is a right side view of the vibratory frame assembly of FIG. 1.

FIG. 5 shows an exemplary vibratory frame assembly 4 that comprises a support frame 10, a plurality of isolators 12, at least two vibratory frame side members 14, at least two vibratory cross-members 15, at least two motorized vibrator assemblies 16, and a plurality of spring assemblies 18. The support frame 10 in one embodiment comprises two side tubular members 20 and each of front and back tubular members 22, 24, respectively. The tubular members 20 can be square in cross-sectional view and can be secured adjacent their respective ends to form a substantially rectangular shape. In one embodiment, the length and width of the support frame 10 can follow the footprint of the vibratory frame side members 14, although it has been contemplated that the support frame 10 can comprise various shapes, dimensions and configurations to provide less or more support as necessitated by the operating conditions.

In one embodiment, the vibratory frame side members 14 (shown in FIGS. 4 and 5) are in the shape of an elongated plate having a thickness of about 5/8 inches, a height of about 16 inches, and a length of about 96 inches. In another embodiment, it has been contemplated that the vibratory frame side members 14 can vary in thickness by about 1/4 inch to about 1 1/2 inches, in height by about 6 inches to about 24 inches, and have a length that would be substantially similar to the length of the pan assembly 6. Further, because the apparatus 2 can vary in size to accommodate various types of process configurations of varying scale, the dimensions of the vibratory assembly components can vary substantially outside of these dimensions. Also, it has been contemplated that the vibratory frame side members 14 can vary in shape as well, such as triangular or square. Still further, in one embodiment, two cross-members 15 are secured between, and substantially perpendicular to, the vibratory frame side members 14 as shown in FIGS. 4 and 5. In another embodiment, fewer or additional cross-members 15 can be used to provide for various apparatus 2 configurations.

The support frame 10 is secured to the vibratory frame side members 14 by the isolators 12. In one embodiment, the support frame 10 and the vibratory frame side members 14 each have mounts such as brackets 17 extending therefrom for securing the isolators 12 in a vertical orientation (as shown in FIG. 5), although it has been contemplated that the isolators 12 can also be secured in other ways, such as using other protrusions 43 or indentations, and at various angles. Further, although the exemplary embodiment depicted has four isolators 12 and eight brackets 17, it has been contemplated that increasing or decreasing the number of these components can provide varying degrees of stability and support as required.

The isolators 12 are configured to provide support and isolation and therefore can vary in size and hardness. In one embodiment, the isolators 12 are constructed using a polyurethane tube that is about 6 inches in length and has about a 2 1/2 inch thick wall, and a hardness rating of 40-60 durometers. Although in other embodiments, the dimensions and hardness can vary depending on the application, for example from about 2 inches to about 10 inches in length, about 2 inches in diameter to about 10 inches in diameter, and about 40 to about 70 durometers in hardness. The dimensions and weight of the vibratory frame and pan assemblies 4, 6 can at least partially dictate the aforementioned parameters, and therefore the dimensions can vary substantially.

In one embodiment, the vibratory frame assembly 4 further comprises a motorized vibrator assembly 16 mounted to each of the vibratory frame side members 14. The motorized vibrator assembly 16 is adapted to impart energy to the vibratory frame side members 14 at an angle β below the horizontal (as shown in FIG. 5). In an exemplary embodiment, β ranges from about 15 degrees to about 60 degrees, for example, about 45 degrees, although in other embodiments β can vary more or less. In an exemplary embodiment, the motorized vibrator assembly 16 includes a motor 28 coupled to a pair of eccentric vibrators 30, for example, a pair of rotary magnetic vibrators such as the Motomagnetic electric vibrator as manufactured by Martin Engineering Nepoinset, Ill. Model ST12-1440. In one embodiment, the motor 28 is speed-controlled by an inverter (not shown), such as the POWERFLEX 40 as manufactured by Allen Bradley, although in another embodiment a hydraulic speed control can be used, for example of the type manufactured by Sun and Bosch. Further, the energy imparted to the vibratory frame side members 14 by the motorized vibrator assembly 16 is at least partially transferred from the vibratory frame assembly 4 to the pan assembly 6 by the plurality of spring assemblies 18.

Figure 6:
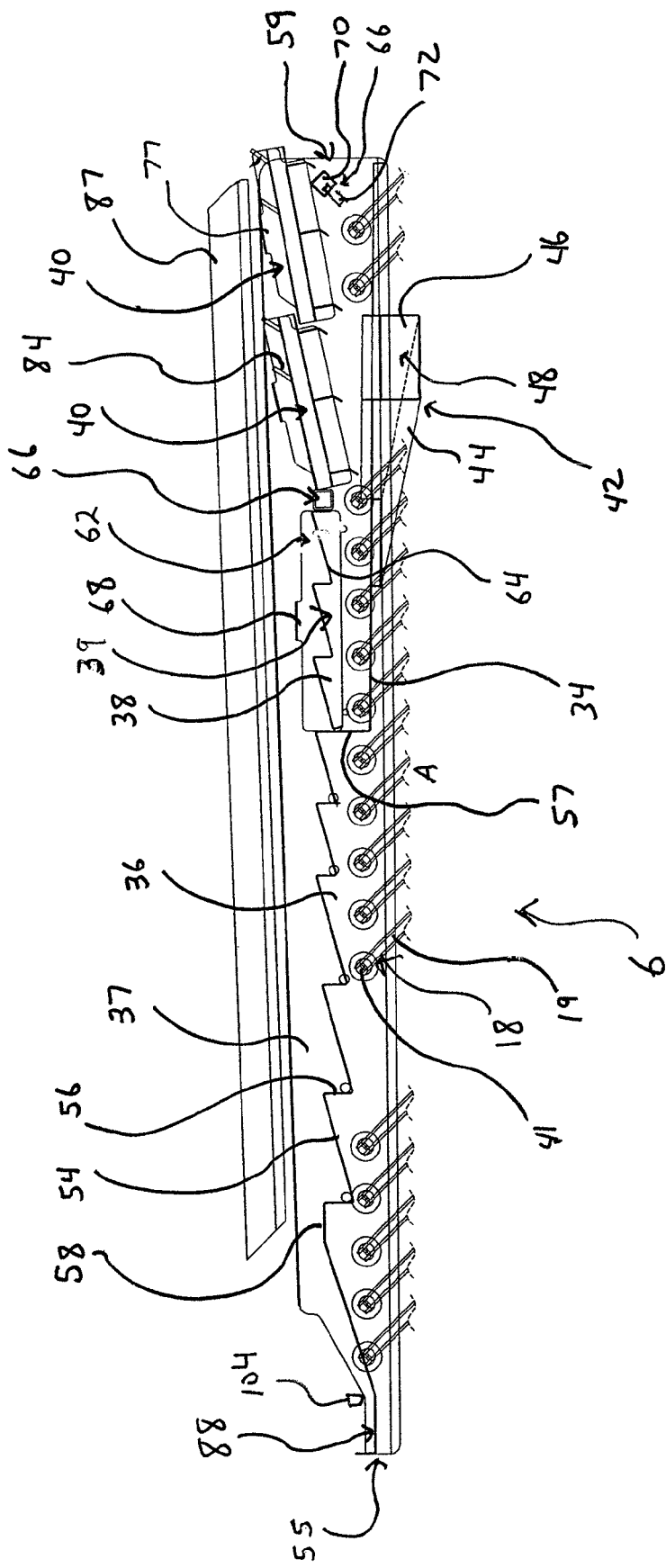
FIG. 6 is a right side view of the pan assembly of FIG. 1.
Figure 10:
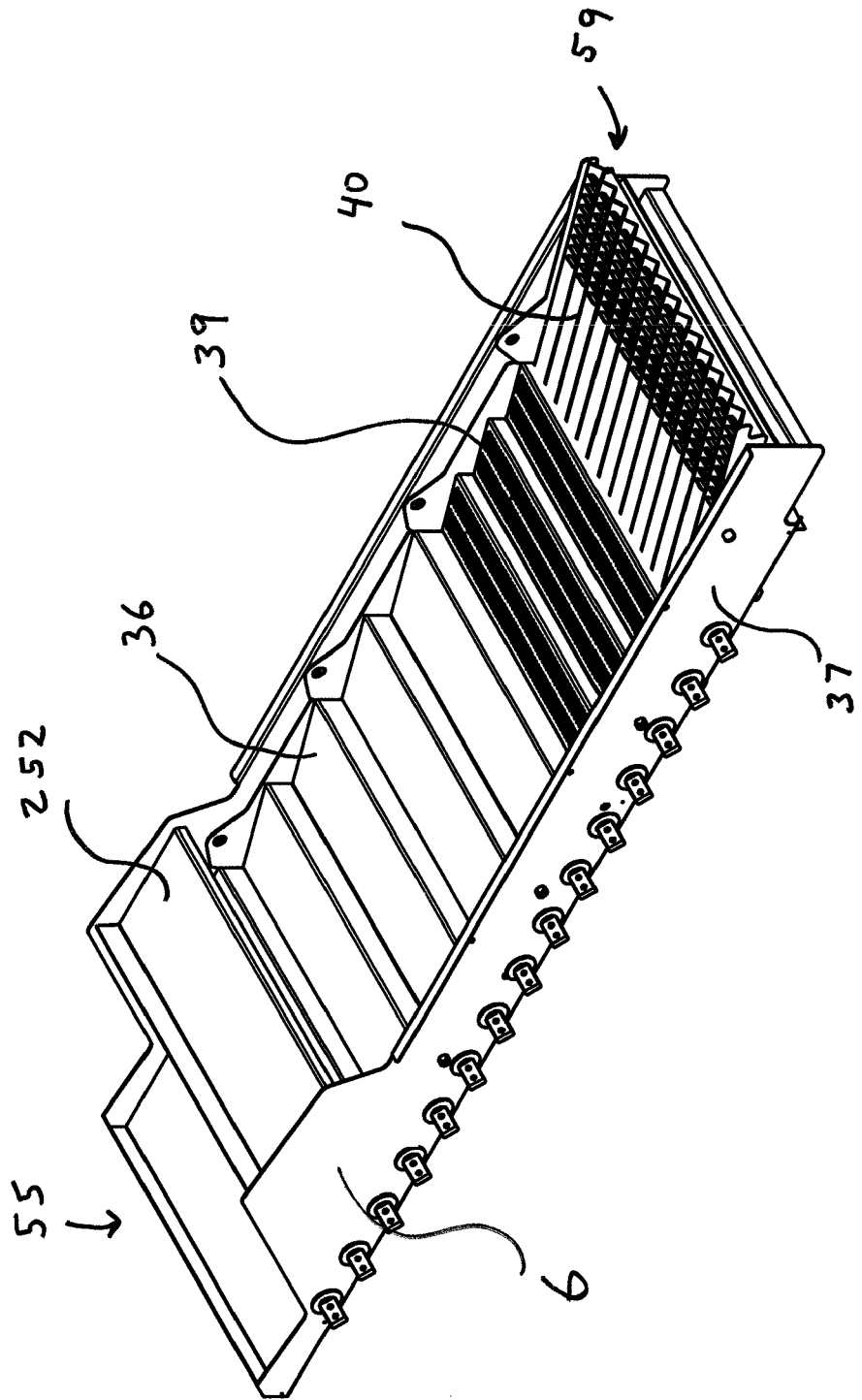
FIG. 10 depicts a portion of an exemplary pan assembly.

Referencing FIGS. 6 and 10, an exemplary embodiment of the pan assembly 6 is depicted comprising of a pan bottom portion 34, pan side portions 37, at least one step 36, of which forms a coating application portion, at least one perforated step assembly 39, of which forms a sifting portion, at least one alignment tray assembly 40, of which forms an alignment portion, and a recycle trough 42. The vibratory frame assembly 4 is in communication with the pan assembly 6 by way of the plurality of spring assemblies 18, more particularly, the pan side portions 37 are connected to the vibratory frame side members 14 by the spring assemblies 18. In an exemplary embodiment, each spring assembly 18 comprises 1 or more springs 19 with a fastener 41 at both ends of the spring 19, where the fastener 41 secures the springs 19 adjacent to each other and also secures them to protrusions 43 on both the pan side portions 37 and the vibratory frame side member 14. The springs 19 can be constructed from high performance composite materials, such as, but not limited to, E-glass/epoxy, carbon fiberglass/epoxy, (carbon/glass)/epoxy, fiberglass/polyester, and high temperature glass/epoxy in cross-ply, spring orientation and unidirectional (e.g., 80%) pre-preg constructions available from Compositflex, Inc., Erie, Pa. In an exemplary embodiment the protrusions 43 can be cast brackets 17 that are welded in place, although other spring assembly 18 fastening means have been contemplated. Further, in an exemplary embodiment, three springs 19 can be used for each spring assembly 18 and thirty-four spring assemblies 18 can be used (seventeen spring assemblies 18 located on each side of the apparatus 2). The number of spring assemblies 18 provided are largely dependent on the weight of the pan assembly 6 (greater weight requires more springs), and therefore, the number of spring assemblies 18 can increase or decrease in quantity and size as is necessary to compensate for the weight.

The motorized vibrator assemblies 16 impart an oscillating force on the pan assembly 6. The frequency of the oscillating force imparted is dependent on the speed of the motor 28, with the speed of motor 28 being dependent on the accumulation of the spring constants of springs 19 versus the weight of the pan assembly 6, as discussed further below. In an exemplary embodiment the speed can vary from about 600 rpm to about 1200 rpm, for example, about 850 rpm, although in other embodiments the speed can vary from about 100 rpm to about 2000 rpm.

The spring assemblies 18 are oriented at an angle θ below the x-axis 13 (as shown in FIG. 2). In an exemplary embodiment θ can be between about 15 degrees and about 85 degrees, for example about 45 degrees, although in other embodiments θ can vary more or less. In at least one embodiment, the angle θ can be substantially equal to the angle β.

The selection of spring quantity and spring constants can be derived in one embodiment by the following: given a natural frequency ($F_n$ in cycles per minute) and pan assembly 6 mass (m in pounds-mass) (i.e., the total mass of the pan assembly 6 and the sum of all the individual spring constants ($\Sigma K$ in pounds per inch)) is equal to the number of springs 19 (assuming each spring has the same constant) multiplied by $(\pi F_n/30)^2(m/386)$. Thus, the spring constant for each spring 19 is $\Sigma K$ divided by the number of springs 19.

In an exemplary embodiment, the spring constant is about 95 pounds/inch, the width of each spring 19 is about 2½ inches, the length of each spring 19 is about 14 inches and the thickness of each spring 19 is about ¼ inch, although other values have been contemplated. In another embodiment the spring 19 can range in length from about 10 inches to about 20 inches, the spring 19 thickness can be from about ⅛ inch to about ½ inch and the spring 19 width can be from about 1 inch to about 4 inches, although other values have been contemplated. Additionally, the size of the spring 19 can control the stroke (distance traveled by the pan assembly 6 as measured from the oscillation spring end secured to the pan assembly 6). In an exemplary embodiment the stroke can range from about ¼ inch to 1½ inches, more particularly about 1 inch, although other values have been contemplated. In terms of overall design, in an exemplary embodiment the spring constant is designed such that the operating frequency $F_o$ of the vibratory frame side members 14 is about 20-40% of their natural frequency $F_n$, more particularly, $F_o$ is about 33% of $F_n$, although other values have been contemplated. As discussed above, based on the desired size and resultant weight of the apparatus 2, various components, such as the aforementioned, can be sized differently as necessary to produce the desired vibratory action.

Further in reference to FIG. 6, the steps 36, the perforated step assembly 39 and the alignment tray assemblies 40 are situated substantially in-line and form a surface for a food product to travel in order to apply a coating thereon. In an exemplary embodiment, the steps 36 are formed from a continuous piece of substantially planar material, such as metal or plastic that is bent or otherwise formed as a series of steps 36 with each step 36 having a ramp portion 54 and a vertical drop portion 56. In one embodiment, the ramp portion 54 can have an inclination angle α from about 5 degrees to 25 degrees, more particularly about 15 degrees (as shown in FIG. 2), although other values for a have been contemplated. In at least one embodiment, the ramp portion 54 and the drop portion 56 comprise substantially planar surfaces. Additionally, a loading plateau 58 for receiving food product thereon can be situated on or adjacent to the first step 36 located at an inlet end 55 of the pan assembly 6. FIG. 6 depicts an exemplary embodiment with 6 steps 36, although fewer steps 36 can be used to shorten the process time or apparatus length, and additional steps 36 can be used to provide a more thorough coating process. Further, the steps 36 can be formed from a single piece of material or can be grouped as one or more steps 36 that are formed from multiple pieces of material, thereby allowing selective removal of only a single step 36 or group of steps 36.

Outer step edges 60 (best shown in FIG. 3) of the steps 36 are secured to the pan side portions 37, by one of various methods such as welding, soldering or formed indentations that can receive the steps 36. In one embodiment, the piece of material that forms the steps 36 can also be used to form the pan bottom portion 34. The material at the bottom of an extended drop portion 57 can be formed at a substantially 90 degree angle with respect to the extended drop portion 57, such that it forms an extension off the steps 36 that proceeds in a linear manner between the pan side portions 37, such that it is situated underneath the perforated step assemblies 39. Additionally, the pan bottom portion 34 can be secured to the pan side portions 37 using welds or a fastener such as a bolt. In another embodiment, the pan bottom portion 34 can be a separate piece of material that is secured to the extended drop portion 57.

Further, in an exemplary embodiment, the recycle trough 42 is formed as a portion of the pan bottom portion 34 (best shown in FIGS. 3, 4 and 6) where the recycle trough 42 extends from the pan bottom portion 34 diagonally in the direction of a discharge end 59 of the pan assembly 6 and in a downward direction of about 10 degrees with respect to the pan bottom portion 34, resulting in a trough end 48 being situated about 4 to about 6 inches below the pan bottom portion 34. Additionally, in one embodiment the downward direction of the recycle trough 42 can be from about 5 degrees to about 20 degrees. The recycle trough 42 further includes a bottom portion 44 and a wall portion 46. The wall portion 46 provides a backstop for recycled coating to abut and therefore be directed downwards (substantially by vibration) along the bottom portion 44 exiting at the trough end 48. Alternative embodiments of the recycle trough 42 can include various other coating exit paths.

Still referencing FIG. 6, in an exemplary embodiment, the pan side portions 37 secured to the pan bottom portion 34 provide a space for insertion of the perforated step assembly 39 and the alignment trays 40. In one embodiment, the perforated step assembly 39 comprises perforated steps 38 that are similar to steps 36, with the addition of a plurality of slots 50 formed therethrough (shown in FIG. 3). FIG. 6 depicts the perforated step assembly 39 with three perforated steps 38, although fewer steps 38 can be used to reduce the apparatus 2 length or the processing time, and conversely, additional lengths can be added to further sift the coating from the food product.

In one embodiment, the perforated step assembly 39 further comprises a pair of side panels 62 that are each secured to a perforated step edge 64 (also shown in FIG. 3) at a substantially perpendicular angle. The perforated step assembly 39 is sized to be situated adjacent the pan side portions 37, the extended drop portion 57, and the alignment tray assembly 40. A pan cross-member 66 comprising a rod 70 and a spring latch 72 extends through apertures in the pan side portions 37. When the spring latch 72 is in a locked position, the perforated step assembly 39 is secured in the pan assembly 6, between the pan side portions 37 by the rod 70. The side panels 62 can further include a handle 68 formed on an upper portion for removal of the perforated step assembly 39 from the pan assembly 6 for cleaning or replacement. In one embodiment, the perforated step assembly 39 can be permanently secured, such as welded in place or temporarily secured using a fastener, such as a bolt.

Further, regarding the slots 50 formed through the perforated steps 38, in one embodiment the slots 50 are situated at least partially non-parallel with respect to the length of the pan side portions 37. Additionally, in an exemplary embodiment, the slots 50 are about 3/16 inches wide, have a length of about 3 inches and a center to center distance (with respect to width) of about 3/8, although in other embodiments the slots 50 can vary in range from 3/16 inch to about 1/2 inch wide, have a length of about 3 inches to about 6 inches, and a center to center distance of about 3/8 inch to about 1 inch. The slots 50 allow finer particles of coating situated on the perforated steps 38 to pass therethrough and into the recycle trough 42, thereby removing excess coating from the perforated steps 38 and allowing the coating to be delivered to the coating recycle assembly 8 for re-use. It has been contemplated that other embodiments can vary the slot width, length and direction to accommodate various coatings; for example, a very course coating can require a larger size slot 50, and slots 50 situated at specific angles can be advantageous for some food products. Further, the slots 50 can be formed by various methods, for example drilling or punching the perforated steps 38.

In FIG. 6, the alignment tray assemblies 40 are shown situated adjacent the perforated step assembly 39, and between the pan side portions 37. In an exemplary embodiment, the alignment tray assemblies 40 are comprised of a pair of alignment tray sides 74 and a bottom tray portion 76, as shown in FIG. 3. The alignment tray sides 74 are secured at substantially perpendicular angles at either side of the bottom tray portion 76. Referring now to FIG. 6, another pan cross-member 66 extends through apertures in both of the pan side portions 37 such that when the cross-member 66 is in a locked position, the alignment tray assemblies 40 are secured between the pan side portions 37 of the pan assembly 6. The alignment tray sides 74 can each further include a tray handle 77 (best seen in FIG. 4) formed on an upper portion for removal of the alignment tray assemblies 40 from the pan assembly 6 for cleaning or replacement. Further, in at least one embodiment, the alignment tray assemblies 40 are situated at angle Ω (FIG. 2) that can range from about 10 degrees to about 20 degrees, for example 15 degrees, although in another embodiment this angle can angle can further vary. The upward angling of the alignment tray assemblies 40 promotes elongation of the food product as it travels towards the discharge end 59.

In an exemplary embodiment the bottom tray portion 76 is formed as a corrugated piece of metal having tray channels 78 formed by the corrugations, wherein the tray channels 78 have a top edge 80 and a bottom edge 82, as shown in FIGS. 3 and 4, and are used to elongate and align the food products. In an exemplary embodiment, the inclusive angle between adjacent top edges 80 can range from about 60 degrees to about 160 degrees, for example 90 degrees, although it has been contemplated that in another embodiment the angle can further vary. In an exemplary embodiment, the top edges 80 can have a spacing there-between of about 3 5/16 inches, and a height from top edge 80 to bottom edge 82 of about 1 9/16 inches, although it has contemplated that in another embodiment the top edges 80 can have a spacing there-between of about 2 inches to about 6 inches, and a height from top edge 80 to bottom edge 82 of about one inch to about four inches. Additionally, the spacing and height can be lesser or greater as dictated by the size of the food product being processed.

Additionally, one or more of the top edges 80 can include a separator pin 84 to guide the food product off the top edge 80 of the tray channels 78. If multiple separator pins 84 are used, they can be in staggered positions as shown in FIG. 3. Staggering can reduce or prevent the blockage of the tray channels 78. The separator pins 84 provide a barrier to force the food product off the top edge 80 and therefore can be any protrusion that serves this purpose, such as a rod 70 having a circular or triangular cross-section, or a v-shaped metal divider that imparts separation trajectories pointing away from the oncoming food product. The separator pin 84 can extend in a direction that is towards the discharge end 59 of the pan assembly 6 and upward off the top edge 80 at an angle of about 1 to about 90 degrees. Additionally, in an exemplary embodiment the separator pin 84 can have a length of about 2 1/4 inches and a diameter of about 3 1/8 inches although it has been contemplated that in another embodiment the length can be from about 1 inch to about 3 inches, and the diameter can be about 1/4 inch to about 1 1/2 inches. Additionally, the length and diameter can be lesser or greater as dictated by the size of the food product being processed with a larger food product requiring a larger length and/or diameter.

Referring to FIG. 3, two exemplary alignment tray assemblies 40 are shown, the first having separator pins 84 and the second having a plurality of tray holes 86 situated along the bottom edge 82 of the tray channel 78. The tray holes 86 can be provided to remove larger agglomerations of coating and/ or smaller pieces of food product from the bottom tray portion 76. The tray holes 86 can be of varying diameter and are sized to accommodate the particular type of coating and food product being processed, for example, in one embodiment the tray holes 86 can range from about ¼ inch to about ¾ inch, and have a center to center spacing of about ⅜ inch to about 1 inch. In an exemplary embodiment, one or more alignment tray assemblies 40 having separator pins 84 can be used to lengthen and align the food products, and one or more alignment tray assemblies 40 having tray holes 86 can be used to remove agglomerations, various combinations of alignment tray assemblies 40 can be used having both separator pins 84 and tray holes 86 or neither separator pins 84 and tray holes 86. Further, as shown in FIG. 6, a dust cover 87 is mounted to the support frame 10 and situated substantially over the pan assembly 6. The dust cover 87 serves to minimize the dust created by the coating process.

Figure 7:
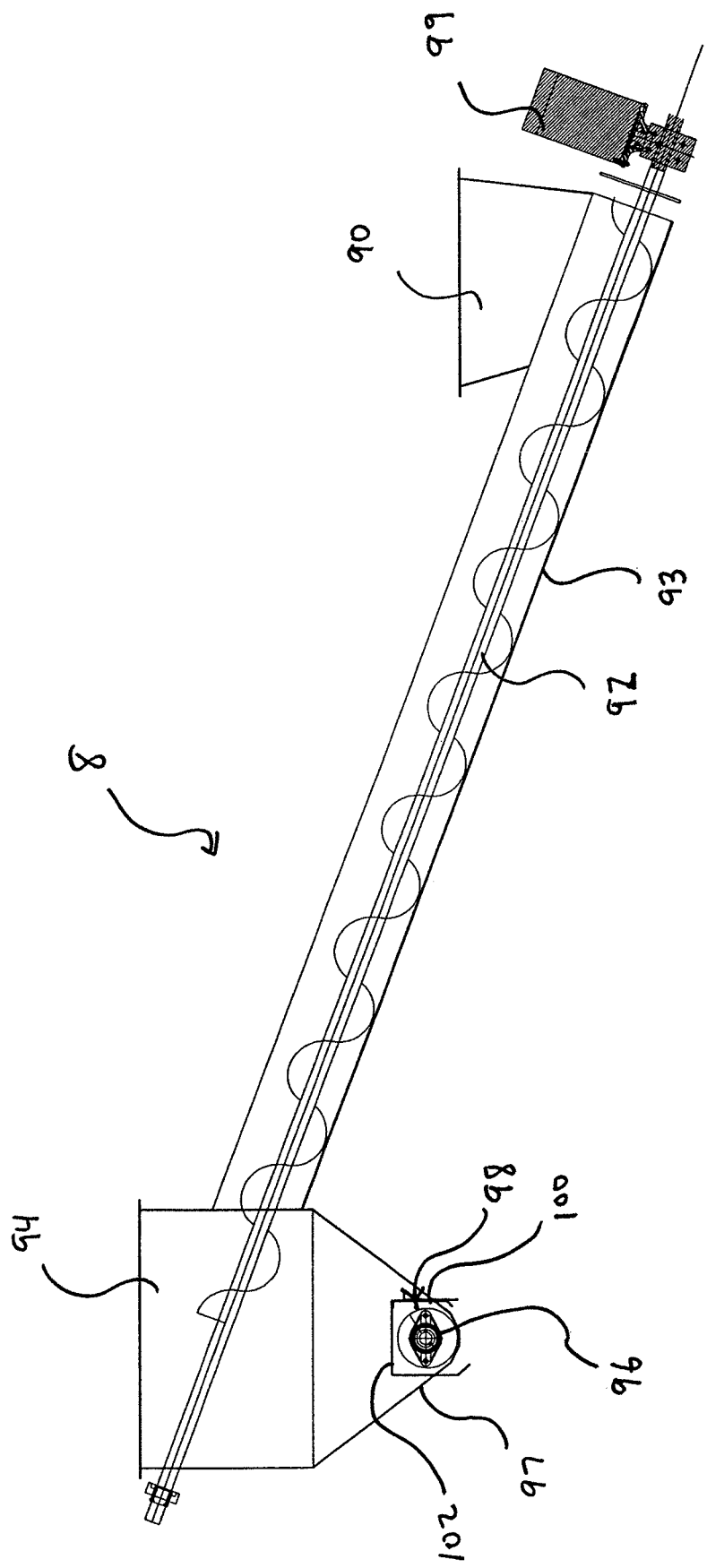
FIG. 7 is a right side view of the recycle assembly of FIG. 1.

Referring to FIGS. 3 and 7, an exemplary coating recycle assembly 8 is depicted that can be used to recycle coating received from the recycle trough 42 and deliver it to a loading surface 88 on or adjacent to step 36. The coating recycle assembly 8 comprises a recycle hopper 90 that can be mounted to the support frame 10 or to a separate frame, and positioned such that recycled coating is directed into the recycle hopper 90 from the recycle trough 42. Additionally, the recycle hopper 90 is in communication with a recycle auger 92 and recycle auger housing 93 that transfers the recycled coating into a feed hopper 94. The feed hopper 94 can be mounted to the support frame 10 or to a separate frame. The coating is then transferred by a feed auger 96, situated adjacent a feed hopper bottom 97, through an opening 98 onto the loading surface 88 of the step 36. Alternatively, the coating can be distributed without the use of the feed auger 96, into a partially enclosed containment chamber (not shown) as discussed later. In an exemplary embodiment, the feed hopper 94 is situated at a higher vertical point than the recycle hopper 90; therefore the recycle auger 92 and recycle auger housing 93 are positioned to direct the recycled coating at an upwards angle. Additionally, in an exemplary embodiment, the recycle auger 92 and the feed auger 96 can have about a 6 inch diameter and a pitch of about 6 inches. In another embodiment, the augers 92, 96 can have a diameter of about 4 to about 10 inches and a pitch of about 2 inches to about 10 inches. Further, in other embodiments the augers 92, 96 can vary in length, diameter and pitch as required by the size of the apparatus 2. In an exemplary embodiment the feed auger 96 is a cross-feed auger, although other embodiments can be modified to use various other styles of augers. Further, in an exemplary embodiment, the recycle auger 92 is driven by a recycle auger motor 99 and the feed auger 96 is driven by a feed auger motor 101. Each motor can be a gear motor, although other drive mechanisms can be used, such as a hydraulic drive.

Further, referencing FIG. 7, the opening 98 can include a metered slide gate 100 that covers an opening (not shown) in a feed auger containment chamber 102 situated in the feed hopper 94. In one embodiment the adjustable opening 98 can be manually operated, although it has been contemplated that the slide gate 100 can be controlled automatically. Alternatively, the slide gate 100 can be omitted and/or a fixed opening can be used. In one embodiment, a coating level sensor 104 (shown in FIG. 6), such as an ultrasonic sensor, can be situated adjacent the loading surface 88 and used for measuring the height level of the coating situated on the loading surface 88. It has been contemplated that the coating level sensor 104 can be one of a variety of sensors appropriate for use with particles, such as an inductive proximity sensor, a laser or a paddle wheel. In one embodiment, the coating level sensor 104 can be used to signal the feed auger 96 to slow down or speed up to control the flow of coating to the loading surface 88. Additionally, in another embodiment the coating level on the loading surface 88 can be controlled by the speed of the feed auger 96 and/or the recycle auger 92, or the speed of the feed auger motor 101 and/or recycle auger motor 99. In an exemplary embodiment, the desired depth of coating can range from about ½ inch to about 2 inches above the loading surface 88. Further, in an exemplary embodiment, a relief valve (not shown) such as an opening with a biased cover-flap, can be situated adjacent the feed auger containment chamber 102 to provide for the discharge of excess coating.

Figure 8:
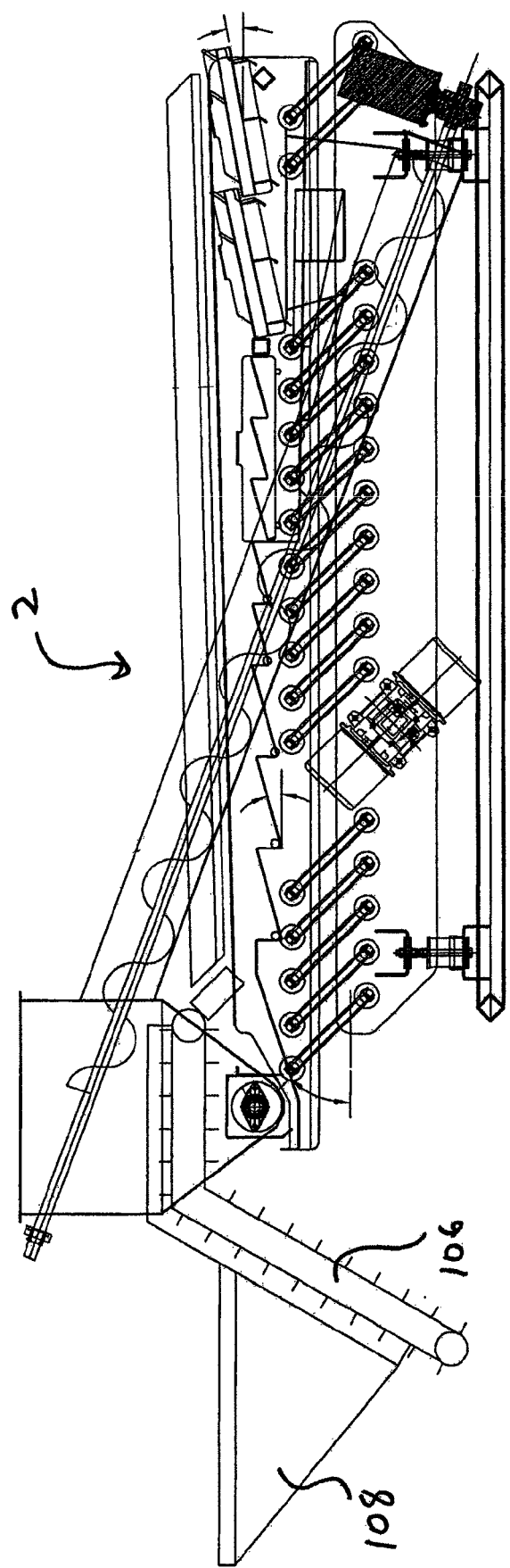
FIG. 8 depicts a system including a metering conveyor along with an exemplary embodiment of an apparatus for applying coating to food products.

To begin operation of the exemplary apparatus 2, the motorized vibrator assemblies 16, recycle auger motor 99 and feed auger motor 101 are activated. The speed of the vibrator assemblies 16 is adjusted to achieve a predetermined frequency and amplitude. Coating is charged into the recycle hopper 90 and is fed via the recycle auger 92 to the feed hopper 94. The feed hopper 94 funnels the coating into the feed auger containment chamber 102 and to the feed auger 96. The feed auger 96 then moves the coating onto the loading surface 88 through the metered slide gate 100. If the coating level sensor 104 detects that the coating level on the loading surface 88 is sufficient, the metered slide gate 100 will reduce or cease the flow of coating to the loading surface 88. The coating is then distributed from the loading surface 88 throughout the pan assembly 6 and coating recycle assembly 8. As shown in FIG. 8, after the coating has been distributed, the food product is fed onto the loading plateau 58 by a means such as a metered conveyor 106 that is supplied by a conveyor hopper 108 or a batter applicator (not shown). The food product moves in a forward direction (from the inlet portion end 55 of the pan assembly 6 towards the discharge end 59 of the pan assembly 6) using the vibrations transferred from the vibratory frame assembly 4 to the pan assembly 6. The vibrations thrust the food product and the coating at about a 45 degree angle towards the discharge end 59, resulting in a forward movement up and over each of the steps 36, with the vertical component of the vibration patting coating to the underside of the food product and the horizontal component moving the food product forward. Further, the step 36 configuration results in the food product being rolled and tumbled as it falls off the drop portion 56, such that the food product is spread apart and coating is applied to multiple surface portions of the food product in a manner that is similar to a home-style application.

Once the coating has been applied to the food product along steps 36, the food product moves onto the perforated step assembly 39 and along the perforated steps 38. The perforated steps 38 continue to roll or tumble the food product in the same manner as steps 36, resulting in some coating being further secured to the food product and some coating falling off of the food product and the perforated step assembly 39, and onto the bottom tray portion 76. The smaller coating particles then fall through the slots 50 in the perforated steps 38 and down into the recycle trough 42. The food product continues moving forward onto the alignment tray assembly 40. As the food product enters the alignment tray assembly 40, it becomes biased by the tray channels 78 in the bottom tray portion 76. As the food product moves along the bottom tray portion 76, the tray channels 78 tend to shift the food product from the top edges 80 into the bottom edges 82. Because the alignment tray assembly 40 has an inclination angle, the food product is elongated as it moves up the bottom tray portion 76. Food product that is positioned substantially across the top edge 80 of the bottom tray portion 76 can encounter a separator pin 84, which tends to force the upward moving food product to shift off the top edge 80 towards the bottom edge 82. In an exemplary embodiment, a second alignment tray assembly 40 having tray holes 86 can be provided adjacent the first alignment tray assembly 40. The second alignment tray assembly 40 receives the food product from the first alignment tray assembly 40 and similarly provides further elongation of the food product. The tray holes 86 allow undesirably small food product pieces and/or agglomerations of coating that did not fall through the slots 50 to fall through the bottom tray portion 76 and be collected separate from the coating collected by the recycle trough 42, thereby removing unwanted material from the process. The food product continues to move across the second alignment tray 40 and onto an off-loading device such as a conveyor belt (not shown) to be further processed. In other embodiments, a single alignment tray 40 can be used having the separator pins 84 and/or the tray holes 86. Additionally multiple alignment trays 40 can be used having the separator pins 84 and/or the tray holes 86, the number of alignment trays 40 being largely dependent on the acceptable size of the apparatus 2.

The alignment tray 40 and other portions of the apparatus 2 can be designed to be the same width of conveyor belts and other devices used with the apparatus 2 such that the food product can move between the apparatus 2 and other devices without rearranging the width of path of the food product traveling through the apparatus 2.

In addition, the food product exits the apparatus 2 at substantially the same elevation as it enters the apparatus 2, thereby avoiding having to adjust the height of other devices used with the apparatus 2 and avoiding having workers having to adjust their stance when working on the apparatus 2.

Still further, the pan assembly 6 can be configured to be as wide or narrow as other process equipment used in conjunction with the apparatus 2, such as a conveyor used to off-load food product. For example, the pan assembly 6 can be 24", 34" or 40" wide, although additional widths are also within the scope of the invention. By using pan assembly 6 widths that are the same width as other food processing equipment located either at the inlet end 55 or the discharge end 59 of the apparatus 2, throughput of food product is less likely to be inhibited throughout a process. In addition, the use the alignment tray assembly 40 can eliminate the need for a secondary process of spreading and aligning food product to a desired position, thereby improving throughput.

Further, regarding the coating recycle assembly 8, the coating that falls through the slots 50 in the perforated steps 38 is substantially received by the wall portion 46 and bottom portion 44 of the recycle trough 42. The coating is then moved substantially by the oscillating vibrations down the recycle trough 42 and exits through the trough end 48 into the recycle hopper 90. The coating in the recycle hopper 90 is transferred by the recycle auger 92 and recycle auger housing 93 to the feed hopper 94, thereby allowing the coating to be recycled and applied to incoming food product.

Figure 9:
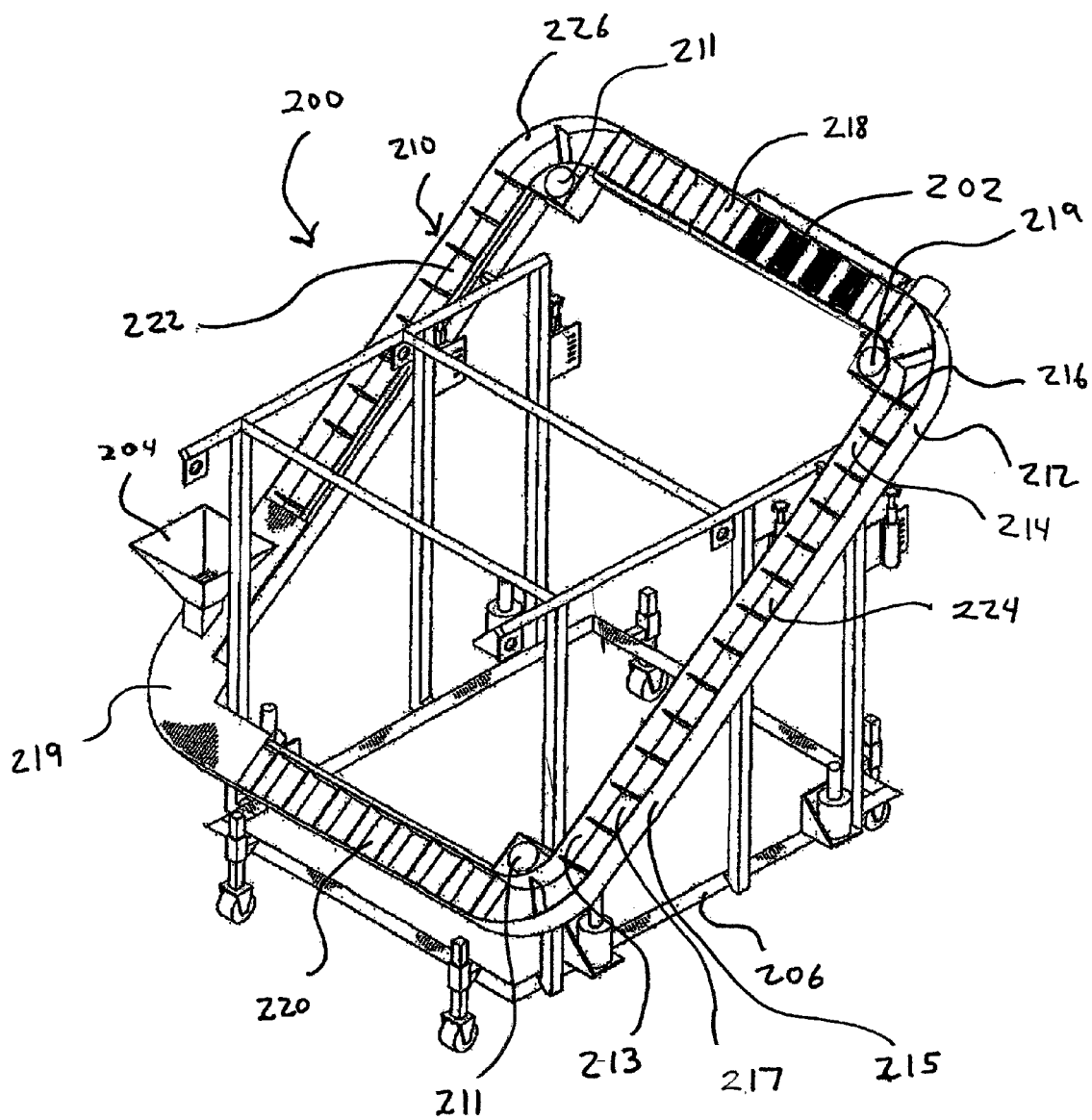
FIG. 9 depicts another exemplary coating recycle assembly.

Another exemplary coating recycle assembly 200 that can be used with the apparatus 2, is shown in FIG. 9. The coating recycle assembly 200 can function without augers, wherein the use of an augerless coating recycle assembly 200 can be more suitable for fine and/or delicate coatings. The coating recycle assembly 200 includes a fill hopper 204 and a recycle conveyor 210. Utilizing the recycle conveyor 210, the coating recycle assembly 200 can recycle the coating without the need for one or more augers, thereby reducing the turbulence experienced by the coating during the recycling process. The recycle conveyor 210 includes a conveyor channel 212 that is mounted to a frame 206 and a drag-chain belt 214 situated at least partially within the conveyor channel 212. The conveyor channel 212 can include an inner side portion 213, an outer side portion 215, a bottom portion 217 and a removable top portion 219. In one embodiment, the drag-chain belt 214 is a solid synthetic with tracking lugs (or drive cogs) (not shown) on one side and flights 216 on the opposite side. The lugs can be secured to the drag-chain belt 214 using a fastener or they can be integrally molded with the drag-chain belt 214 thereby eliminating crevices, fissures, hinges or other structures where coatings and/or topping can become lodged and impede cleaning of the belt. In at least one embodiment, the drag-chain belt 214 can be made of polyester thermal plastic, polyurethane, or another material that can be sufficiently cleaned to meet food process industry standards. An exemplary drag-chain belt 214 is a SuperDrive from Volta of Karmiel, Ill. Another exemplary drag-chain belt 214 is a plastic flighted belt, a Series 800 Open Hinge Impact Resistant Flight model available from Intralox, LLC of Harahan, La.

The flights 216 can vary in size to accommodate the transport of more or less coating, although in one embodiment, the flights 216 are 6 inches by 6 inches. Further, the flights 216 can be oriented at various angles with respect to the inner and outer side portion 213, 215, and the bottom portion 217, although in one embodiment the flights 216 are oriented perpendicular to each of the inner and outer side portion 213, 215, and the bottom portion 217. Further, the flights 216 can be situated such that free ends thereof are perpendicular to and point toward the outer side portion 215.

In an exemplary embodiment, the recycle conveyor 210 is in a rectangular configuration having four corners, where one of the corners includes a sprocketed drive 209 that engages the cogs of the drag-chain belt 214, and the other three corners have drive belt rollers 211 for guiding the abutted drag-chain belt 214, to form a rectangular shape. The sprocketed drive 209 is received on a drive shaft (not shown). An overhung load adaptor (not shown) and a conveyor motor (shown in FIG. 12 as 307), such as a hydraulic or electric motor, are used to rotate the drive shaft. Additionally, the use of a rectangular shaped recycle conveyor 210 permits the drag-chain belt 214 to be wrapped around the apparatus 2, thereby allowing a reduction in the overall footprint of the apparatus 2. Although the recycle conveyor 210 is shown and described as rectangular, other configurations can be used as well, for example, circular or square.

Further referencing FIG. 9, the conveyor channel 212 includes an upper length 218, a lower length 220, an ascending portion 222, and a descending portion 224. The upper length 218 includes a channel opening 202 in the conveyor channel 212 configured to allow recycled coating to flow from the conveyor channel 212 onto a surface below, such as the loading surface 88 or a food product top surface.

With the coating recycle assembly 200, the coating is initially fed into the fill hopper 204 where it is carried by the drag chain belt 214 up the ascending portion 222 and across the upper length 218 of the coating recycle assembly 200. It is then deposited through a base channel opening 202 in the center of the upper portion of conveyor channel 212. Coating that passes through the base channel opening 202 can be collected in a feed hopper 94 (FIG. 7) or the coating can proceed directly to the loading surface 88 or the loading plateau 58, as discussed below. The coating flow can then be metered out of the feed hopper 94 by an adjustable opening (not shown) where it can be directed into a distribution portion such as channels (not shown) and a trough (not shown). The distribution portion can deposit substantially equal amounts of coating onto each side of the loading surface 88, wherein the coating is then spread across the width of the loading surface 88 by the use of a transverse distribution means (not shown) and/or with the assistance of a conveying device such as an auger (not shown). The coating is then carried forward by the vibratory action and moves up the ramp portion 54 (as seen in FIG. 6) and down the drop portion 56 until it reaches the discharge end 59 (FIG. 6) of the pan assembly 6 (FIG. 6) and is deposited into the lower length 220 of the recycle conveyor 210.

Figure 11:
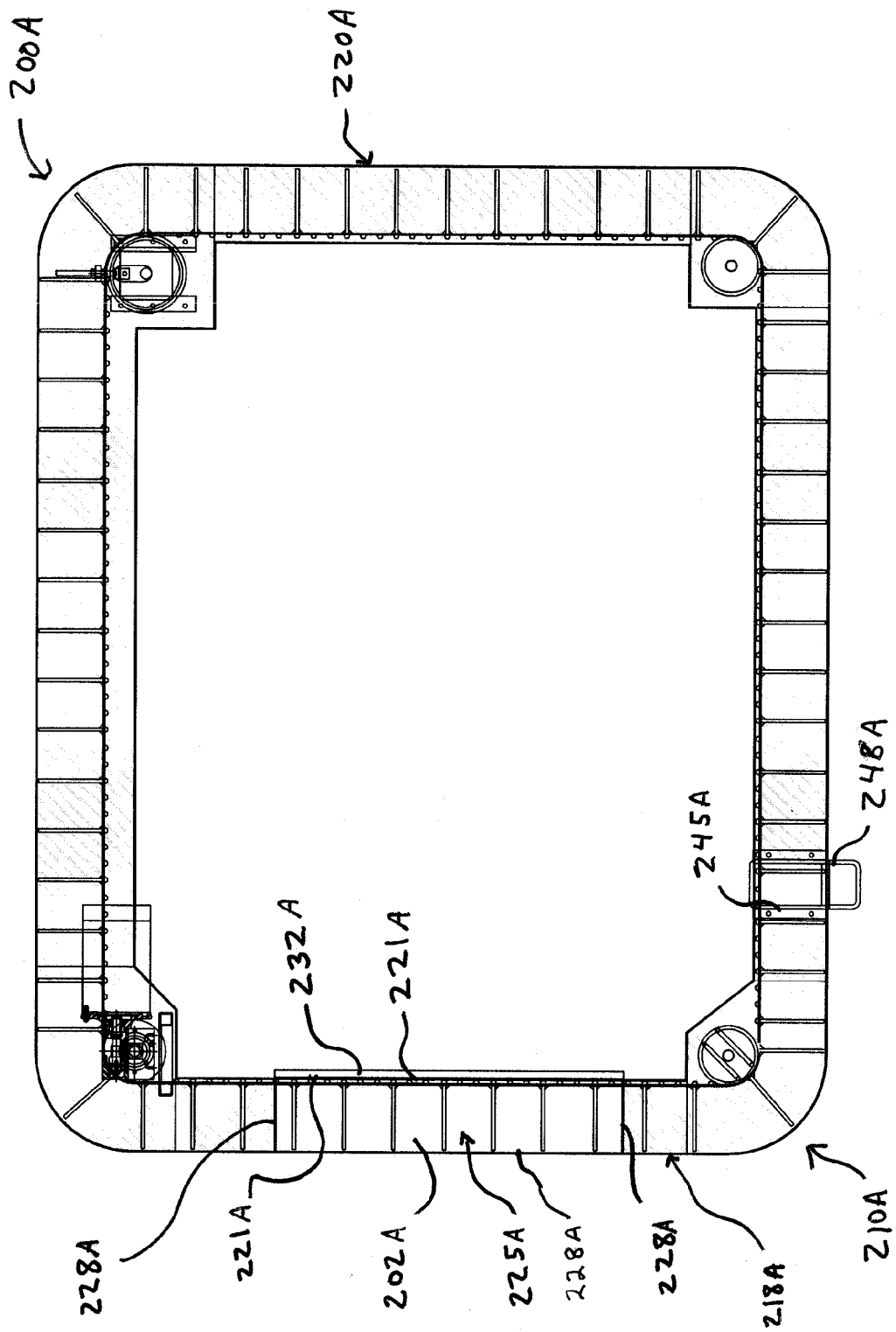
FIG. 11 depicts an exemplary coating recycle assembly.

In another embodiment as shown in FIG. 11, a coating recycle assembly 200A is provided that can include a fill hopper (not shown) and a base recycle conveyor 210A. The base recycle conveyor 210A has a channel opening 202A to provide a flow of coating into a containment chamber 225A situated adjacent to the loading surface 88 (not shown). The containment chamber 225A includes three barrier walls 228A that extend from the channel opening 202A towards the loading surface 88. The barrier walls 228A are combined with a partial dam wall 221A and a chamber opening 230A to form a perimeter about the containment chamber 225A. The chamber opening 230A can be metered with a chamber dam 232A. The chamber dam 232A is movably attached to the partial dam wall 221A, wherein the chamber dam 232A can be positioned closer or farther away from the loading surface 88 to open or close the chamber opening 230A thereby metering the amount of coating that exits the containment chamber 225A onto the loading surface 88. Further referencing FIG. 11, the base recycle conveyor 210A includes a drain trap 245A. The drain trap 245A provides an exit path for removing coating situated in the base recycle channel 210A. The drain trap 245A includes a drain barrier 248A that is slidingly adjustable to allow the recycle coating in the conveyor channel 212A to flow out of the conveyor channel 212A only when desired.

Figure 12:
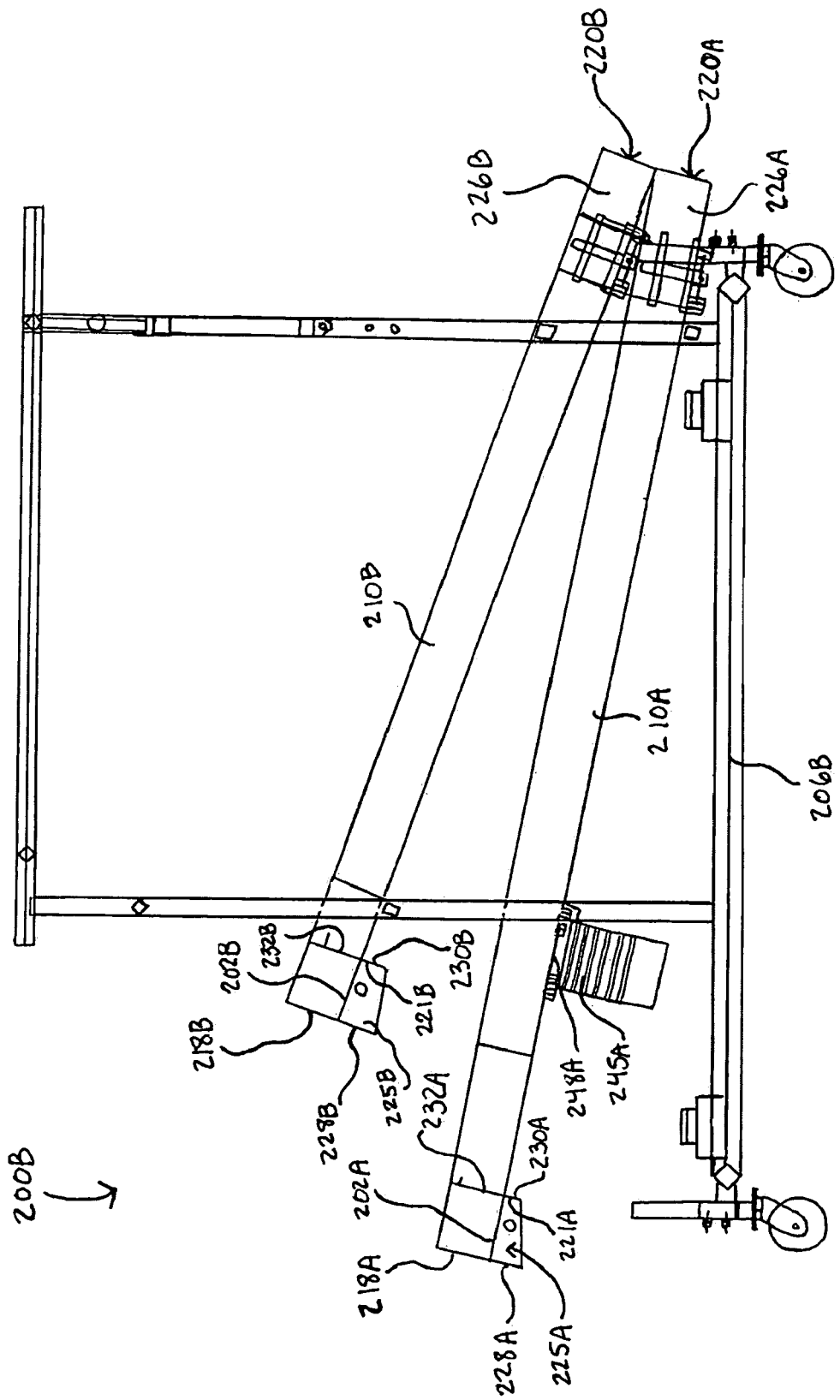
FIG. 12 depicts another exemplary coating recycle assembly.

Although some processes can use a single recycle conveyor 210A to provide coating to a food product, other processes can benefit from the use of more than one recycle conveyor 210A. The use of multiple conveyors provides added flexibility to the apparatus 2 to provide coating at various positions along the pan assembly 6 and on various surfaces of the food product. For example, as shown in FIG. 12, an exemplary coating recycle assembly 200B can include a fill hopper (not shown), a base recycle conveyor 210A and a waterfall recycle conveyor 210B. In one at least one embodiment, the base recycle conveyor 210A utilizes a containment chamber 225A to provide a supply of coating to the loading surface 88 (see FIG. 6), for covering at least the bottom portion of the food product. In addition, the waterfall recycle conveyor 210B includes a containment chamber 225B to provide a supply of coating via a chamber opening 230B adjacent the loading plateau 58 (see FIG. 6) to cover at least a top portion of the food product. Alternatively, the coating that exits the chamber opening 230B can be deposited onto a waterfall ramp 252B (see FIGS. 10 and 13). The waterfall ramp 252B provides a planar surface for receiving the coating. The waterfall ramp 252B extends as necessary to direct the coating to fall upon the food product situated below, for example adjacent the pan assembly 6. The waterfall ramp 252B is mounted to the pan assembly 6 and as a result, is subjected to the vibration of the pan assembly 6. The waterfall ramp 252B can be mounted at a descending angle, such that the vibrations cause the coating, situated thereon, to flow along and off the waterfall ramp 252B in a waterfall manner to provide a wall of coating as the food product is passed underneath. In another embodiment, a sifting plate (not shown) can be situated below the waterfall channel opening 202B or the chamber opening 230B to at least partially catch the coating, with the sifting plate being secured to a portion of the apparatus 2 that vibrates, such as the pan assembly 6. In one embodiment the sifting plate is rectangular with a plurality of slots therethrough. The sifting plate can be inclined so as to act as a dam allowing the coating that falls thereon to spread more evenly, and in at least one embodiment can provide a metered distribution.

As discussed previously, coating that does not adhere to the food product is discharged at the discharge end 59 of the pan assembly 6. Discharged coating can flow into either the base recycle conveyor 210A or the waterfall recycle assembly 210B to be recycled. As the demand for coating can vary between the containment chambers 225A and 225B, a metering plate 254 (FIG. 13) is situated adjacent the discharge end 59 of the pan assembly 6. The metering plate 254 can comprise of a planar meter portion 256 that has a meter opening 258 therein, controlled by a sliding planar meter plate 260. The meter plate 254 receives the coating at the discharge end 59 and can direct at least a portion of it, over the waterfall recycle conveyor 210B and into the base recycle conveyor 210A. The metering is provided by moving the metering plate 254 in position to cover or uncover the meter opening 258.

When utilizing the base recycle conveyor 210A and the waterfall recycle conveyor 210B in combination, the coating recycle assembly 200B can use a single conveyor motor 262B to drive both drag-chain belts and use a single fill hopper 204B (as shown in FIG. 14 mounted on a waterfall recycle conveyor 210B). Although, in at least some embodiments, separate conveyor motors 262B can be used to drive each of the drag-chain belts (FIG. 13) and the fill hopper 204B can be situated on one or both of the conveyors 210A and 210B. Additionally, an auxiliary hopper/conveyor 264B can be used to supply coating to the fill hopper 204B, as seen in FIG. 14.

Figure 15A:
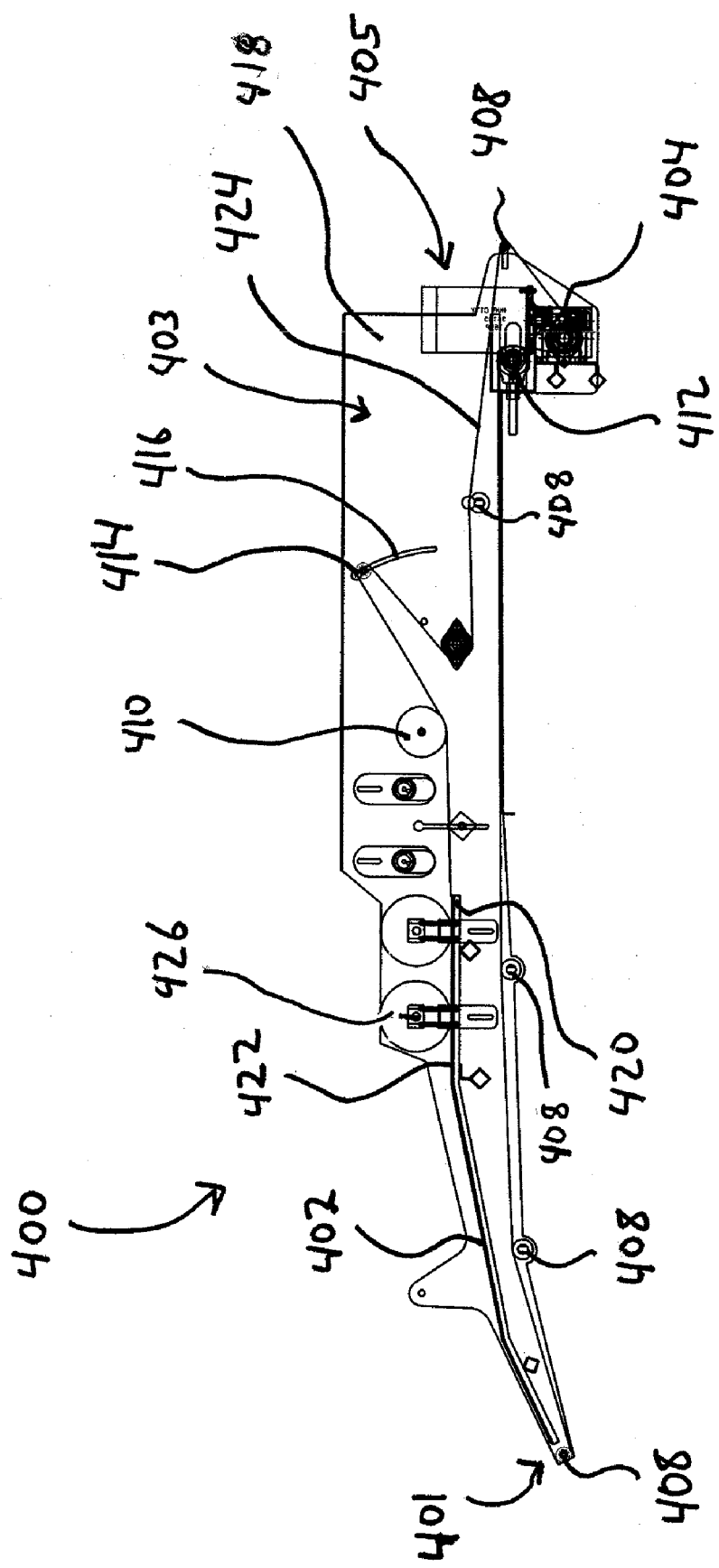
FIGS. 15A and 15B depict exemplary embodiments of a wire conveyor belt assembly.
Figure 15B:
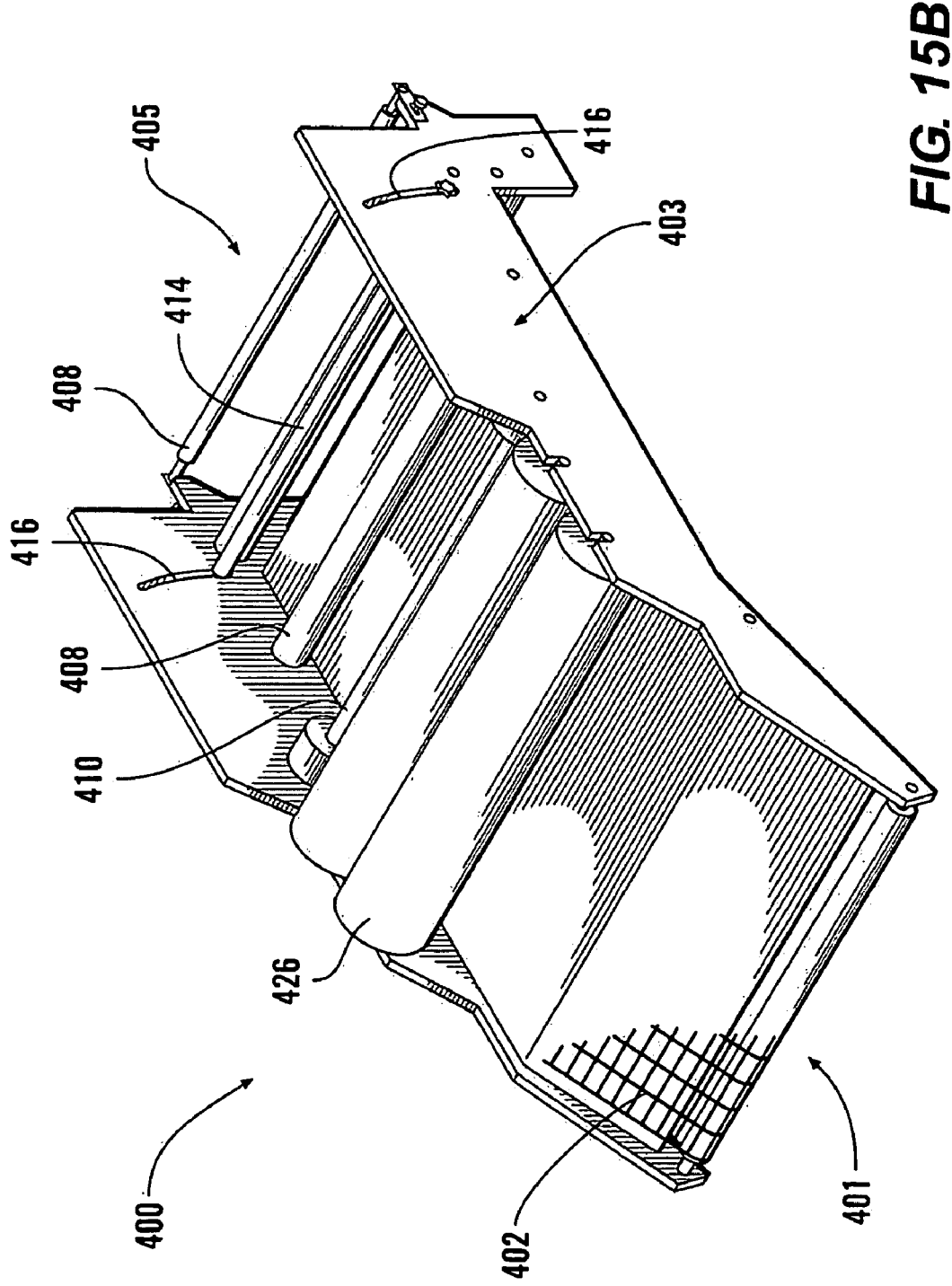

The aforementioned coating recycle assemblies 200, 200A and 200B can be used with an apparatus 2 that includes a wire conveyor belt assembly 400 (see FIGS. 15A and 15B) as described below. The coating of fragile food products that can not endure the rigors of traveling along the steps of the pan assembly 6 can be accommodated by the wire conveyor belt assembly 400. Further, the use of wire conveyor belt assembly 400 can allow for the application of a coating or topping to only a top or bottom portion of the food product. In at least one embodiment, when the wire conveyor belt assembly 400 is used with the coating recycle assembly 200B, the base recycle conveyor 210A can provide a fresh or recycled supply of coating to a loading surface of the wire conveyor belt assembly 400 for coating at least a bottom portion of a food product, and the waterfall recycle conveyor 210B can provide fresh or recycled coating to at least a top portion of a food product situated on the wire conveyor belt assembly 400. An exemplary embodiment of the wire conveyor belt assembly 400, as seen in FIGS. 15A and 15B, includes a proximal end 401 for the intake of coating and food product and a distal end 405 for offloading the food product. The wire conveyor belt assembly 400 further comprises a housing 403, a wire conveyor belt 402 and a drive shaft 404 for actuating the belt 402. Various rollers are included such as support rollers 408 and a hold down roller 410 for altering the path of the belt 402. Additionally, an adjustable roller 412 is included to take up slack in the belt 402. Further, a roller 414 is moveably received in an arcuate groove 416 of a sidewall 418 of the housing 403, as described below. The wire conveyor belt assembly 400 also includes two roller cylinders 426 situated above the belt 402 to press coating and/or topping onto the food product as it passes along the wire conveyor belt 402.

Further, the wire conveyor belt 402 includes an upper conveying surface 422 and a lower conveying surface 424. The arcuate groove 416 allows reorientation of the upper conveying surface 422 with respect to the lower conveying surface 424 and thus, reorientation of the wire conveyor belt 402. Placing the roller 414 at the upper end of the arcuate groove 416 results in the food product moving off the upper conveying surface 422 and landing on the lower conveying surface 424 with the side of the food product that contacted the upper conveying surface 422 now being opposite the side of the product that contacts the lower conveying surface 424. That is, the food product is flipped when it transfers from the upper conveying surface 422 onto the lower conveying surface 424. A benefit of flipping the food product is that when coatings or toppings are lightweight and airy materials, such as flour, flipping food product removes unattached coatings or toppings. As seen in FIG. 15A, in at least one embodiment the wire conveyor belt assembly 400 includes a belt support pan 420 situated underneath a portion of the lower conveying surface 424. The belt support pan 420 provides support to the wire conveyor belt 402 and to the coating that is situated under the wire conveyor belt 402. As the wire conveyor belt 402 travels along, it carries at least a portion of the coating situated underneath.

Figure 16:
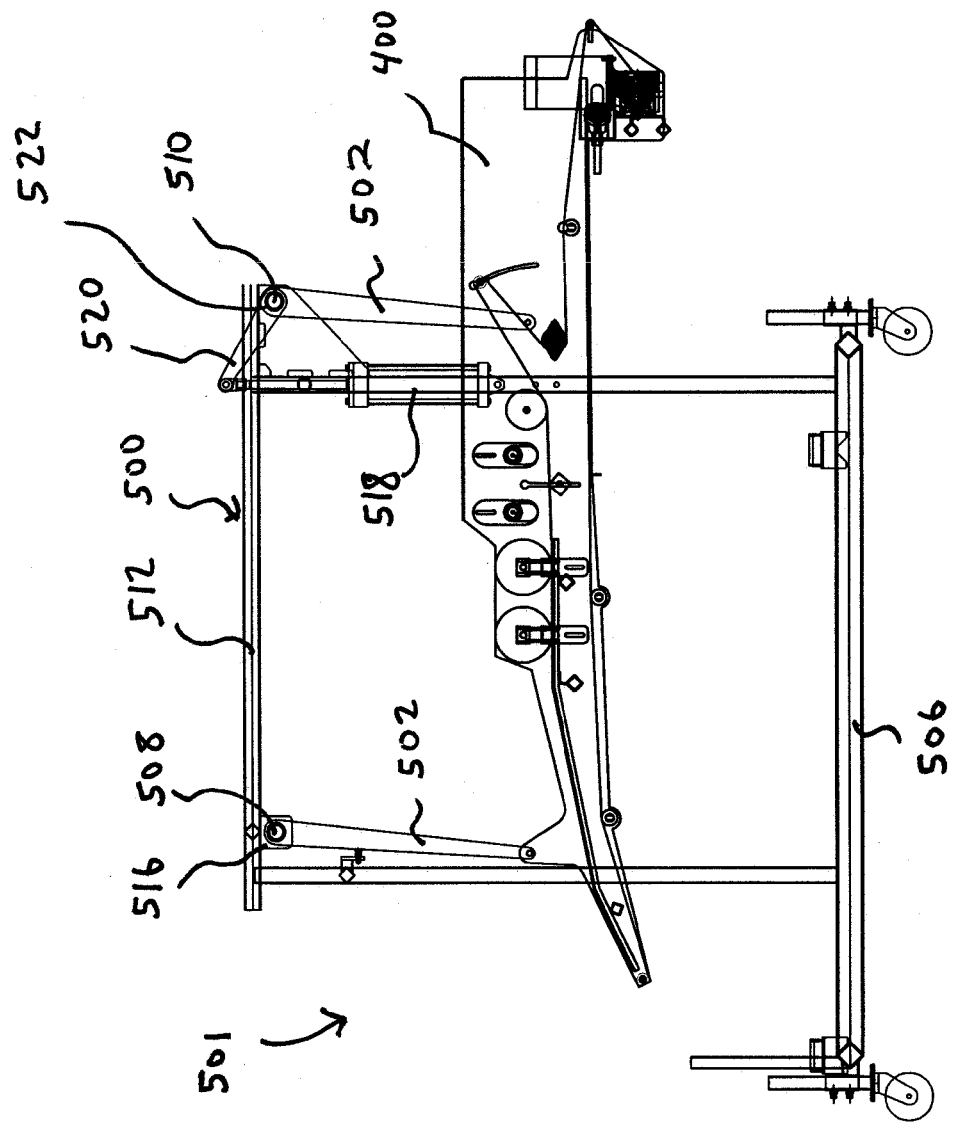
FIG. 16 depicts an exemplary embodiment of the wire conveyor belt assembly, the frame and the swing frame portion.

To provide an apparatus 2 that is capable of universally and selectively applying coatings and toppings to one or more portions of both durable and fragile food products, an exemplary apparatus 2 can include the wire conveyor belt assembly 400, wherein the wire conveyor belt assembly 400 is at least partially removably situated in a position that is adjacent the pan assembly 6, as discussed below. Referring to FIGS. 16 and 22 (the vibratory frame assembly 4 and pan assembly 6 are not shown for clarity purposes), in an exemplary embodiment, the wire conveyor belt assembly 400 is suspended by a swing frame portion 500 to create a wire belt swing assembly 501. The swing frame portion 500 can be secured to a separate swing frame 506 or to at least one of the frames 10 and 306 (FIGS. 5 and 12, respectively). The swing frame portion 500 is configured to support the wire conveyor belt assembly 400 such that it is isolated from vibrations of the vibratory frame assembly 4 and pan assembly 6. The wire conveyor belt assembly 400 is suspended by the swing frame portion 500 with arms 502 on either side. The arms 502 are hinged at both the swing frame portion 500 and at the wire conveyor belt assembly 400. In reference to FIGS. 16 and 22, the arms 502 are hinged at ends of proximal and distal transverse supports 508, 510, which are supported on the upper side members 512, 514 by brackets 516. The arms 502 have a geometry that allows the wire conveyor belt assembly 400 to swing out of an operating position (FIG. 16) and into a non-operation position (as shown in FIG. 21). The swinging motion can be powered by a hydraulic cylinder 518, a pneumatic cylinder, or the like. The hydraulic cylinder 518 is connected to a torque arm 520 and then to a lever shaft 522 that makes up one of the upper hinge points. The lever shaft 522 transmits torque into one set of the arms 502 to create a motion that swings the wire conveyor belt assembly 400 into the non-operating position. The motion could also be accomplished using a rotary actuator, an electromechanical jack, or similar devices.

Figure 13:
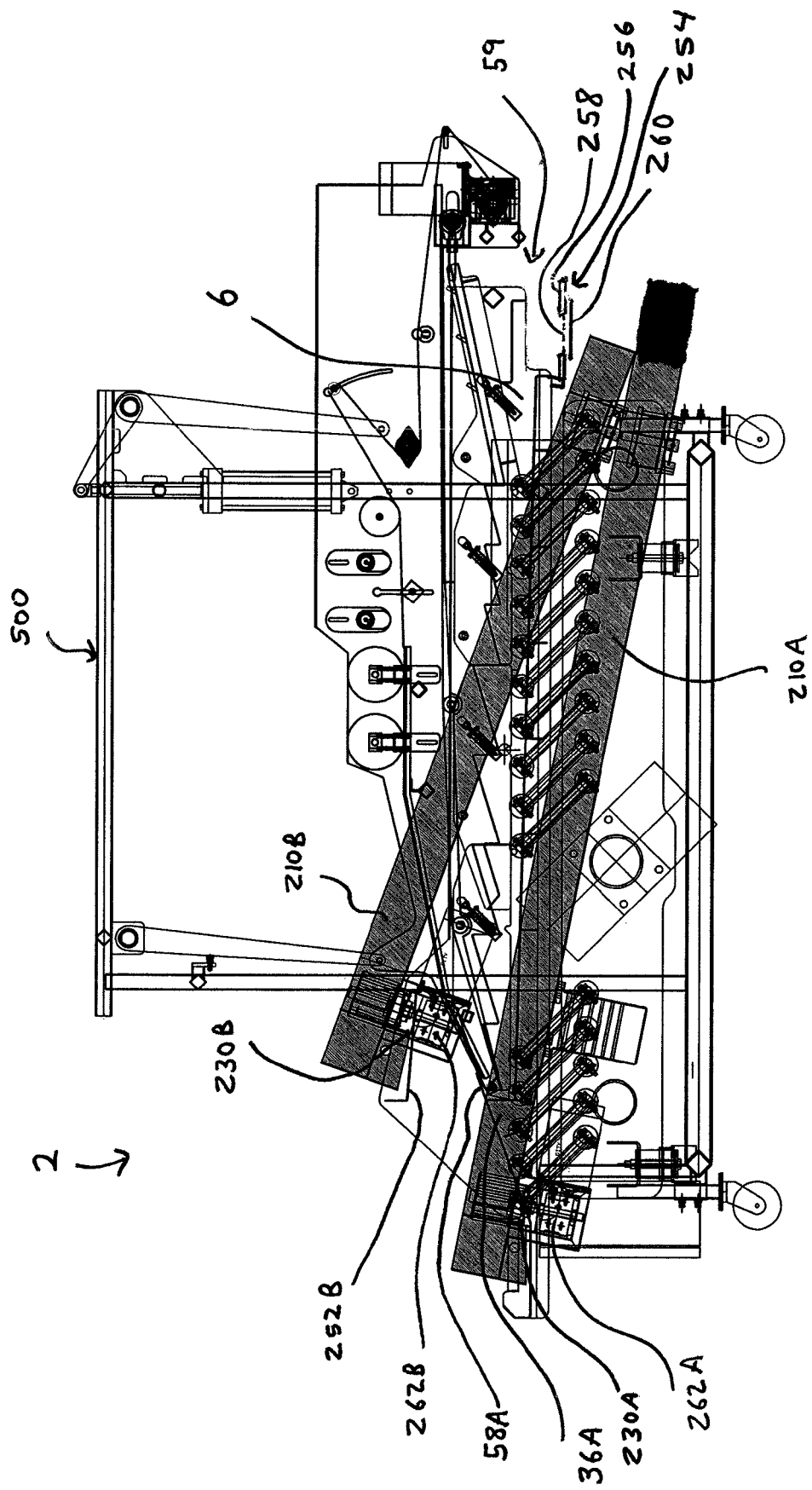
FIG. 13 depicts an exemplary embodiment of the apparatus for applying coating to food products including, a vibratory frame assembly, a pan assembly, a coating recycle assembly, a wire conveyor belt assembly in a production position, a frame and a swing frame portion.
Figure 18:
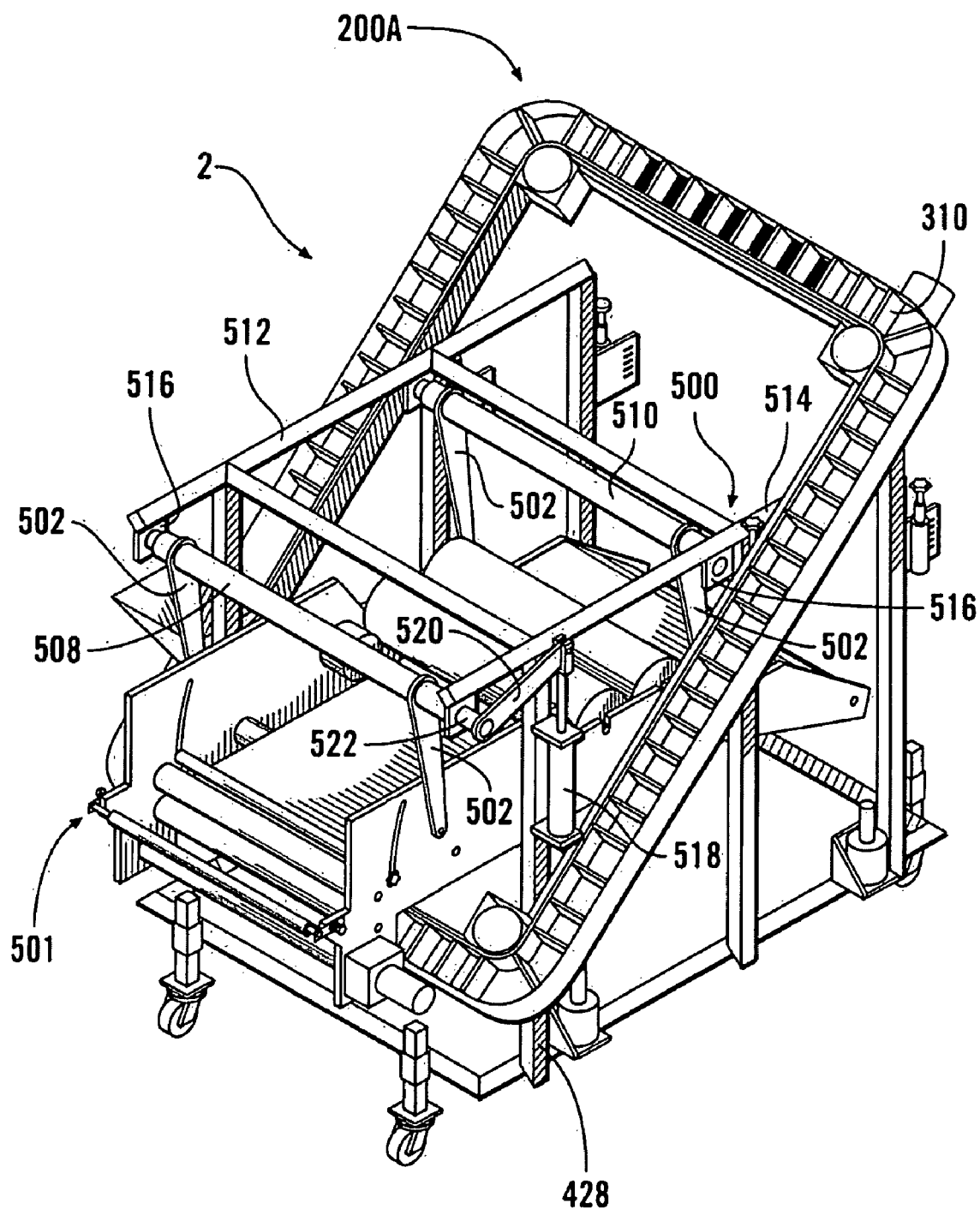
FIG. 18 depicts an exemplary embodiment of the wire conveyor belt assembly, the recycle conveyor, the frame and the swing frame portion.

Referring to FIGS. 13 and 18, the wire belt swing assembly 501 can be utilized with one of the various coating recycle assemblies 200A, 200B. Additionally, the wire belt swing assembly 501 can be utilized in conjunction with a combination of the coating recycle assembly 200A, 200B, the vibratory frame assembly 4 and the pan assembly 6. Further, the wire belt swing assembly 501 can be configured such that the wire conveyor belt assembly 400 can swing in and out of a production position without making contact with other equipment, such as the coating recycle assembly 200A, 200B, the vibratory frame assembly 4 and pan assembly 6.

Figure 17:
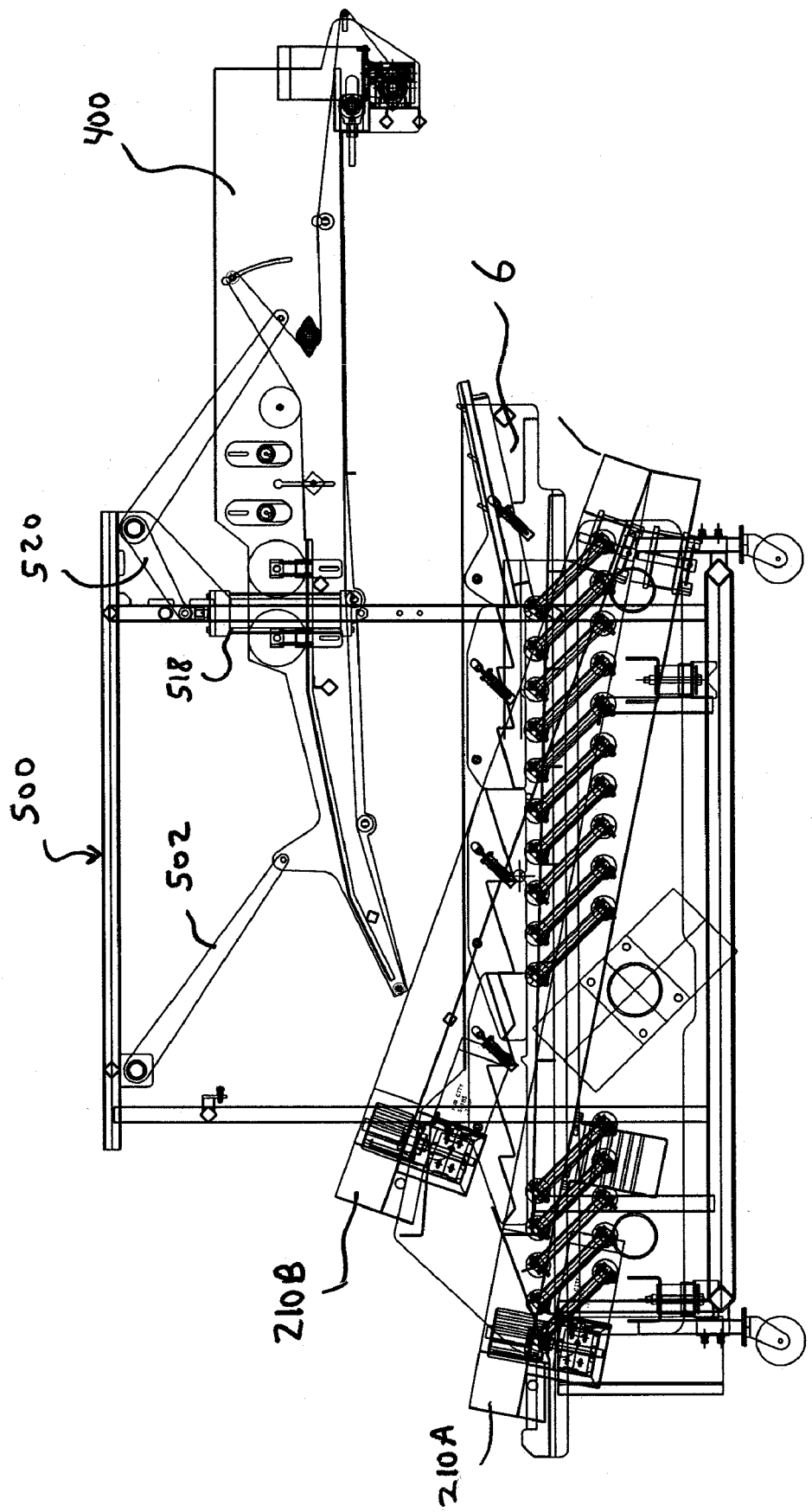
FIG. 17 depicts an exemplary embodiment of the apparatus in FIG. 13, wherein the wire conveyor belt assembly is in a non-production position.

In at least one embodiment, the recycle assembly 200B and the wire belt swing assembly 501 can be secured to the frame 10 of the vibratory frame assembly 4, and used in conjunction with the pan assembly 6 (FIG. 13). This provides the apparatus 2 with the versatility to apply a multitude of coatings, breading and toppings to numerous types of food products. For example, as shown in FIG. 17, the wire conveyor belt assembly 400 can be placed in a non-production position to enable unfettered use of the pan assembly 6, for coating multiple sides of durable food products, as previously described. In this position, the base recycle conveyor 210A is used to convey coating to the loading surface 88 via the base containment chamber 225A. As the food product and coating are moved by vibratory action across the pan assembly 6, the food product is coated. Discarded coating that reaches the discharge end 59 of the pan assembly 6 is deposited into the lower length 220A of the base recycle conveyor 210A by adjusting the metering plate 328 (FIG. 13) so that the coating avoids the waterfall recycle conveyor 210B. Additionally, although not necessary, the waterfall recycle conveyor 210B can be used to provide additional coating onto the food product if desired and can be subsequently recycled as well by adjusting the metering plate 328.

Alternatively, the wire conveyor belt assembly 400 can be situated in a production position to substantially by-pass the steps 36 of the pan assembly 6. This position can be used for coating less durable food products that cannot tolerate the agitation of the steps 36. Additionally, this position allows selective coating of the top and/or bottom portions only of the food product. When using the wire conveyor belt assembly 400, the pan assembly 6 is modified to facilitate moving coating onto the proximal end 401 of the wire conveyor belt assembly 400 (FIGS. 15A and 15B), as opposed to the steps 36 (FIG. 6). The pan assembly 6 is also modified to catch and remove unwanted portions of food product and coating that fall off of the belt support pan 420. To load coating onto the wire conveyor belt assembly 400, the proximal end 401 is situated such that coating will be deposited thereon, instead of continuing along the steps 36 of the pan assembly 6. In one embodiment, step 36 that is part of or succeeds the loading plateau 58 (see FIG. 6) can be removed, to allow the proximal end 401 of the wire conveyor belt assembly 400 to be inserted under the loading plateau 58. In another embodiment as seen in FIG. 13, a modified step 36A having a loading plateau 58A can replace the step 36, wherein the modified step 36A is similar to the first series of steps 36 with the exception that the loading plateau 58A extends as to allow the proximal end 401 of the wire conveyor belt assembly 400 to be positioned underneath the loading plateau 58 and in position to receive coating that is vibrated off the loading plateau 58.

While the wire conveyor belt assembly 400 is operating the pan assembly 6, situated underneath, acts to catch and remove portions of food product and coating that fall off the belt support pan 420 and through the drag-chain belt 214. In one embodiment, the perforated step(s) 38 of the pan assembly 6 can be removed and replaced with one of various filtering configurations to accommodate a particular size and texture of breading, although the perforated steps 38 can also be utilized to provide the filtering. In addition, other steps or trays can be utilized along the pan assembly 6 to provide filtering. The coating that falls through the filtering configuration, such as the perforated steps 38, is vibrated towards the discharge end 59. Coating at the discharge end 59 is then vibrated across or through the metering plate 328 and into at least one of the base recycle conveyor 210A and waterfall recycle conveyor 210B. The larger agglomerations of coating and food product that have been separated from the recycled coating are vibrated across the top of the perforated steps 38 and deposited into a waste receiver (not shown). Further, the aforementioned apparatus 2, without the wire belt swing assembly 501, can be used with the coating recycle assembly 200, 200A, 200B as a stand alone food coating apparatus. Alternatively, the apparatus 2 can be used with the coating recycle assembly 200, 200A, 200B and the wire belt swing assembly 501, to form a multi-use coating apparatus 2.

In addition to the aforementioned embodiments of the apparatus 2, another exemplary embodiment of the apparatus 2 is depicted in FIG. 19, wherein product coating portion coating is applied to the food product using vibrational forces to move the food product and coating down a series of steps 36C. As the food product falls from an upper step 36C to a lower step 36C, the food product can flip and twist allowing folded portions of the food product to unfold. The unfolded portions of the food product are then exposed to the coating situated along the steps 36C, thereby allowing the application of coating to multiple surfaces of the food product as it progresses down the steps 36C. Similar to the aforementioned embodiments discussed above, the apparatus 2C provides a coating to a pan assembly 6C, wherein the pan assembly 6C is connected to a vibratory frame assembly 4C by spring assemblies 18C. Motorized vibrator assemblies 16C are mounted on the vibratory frame side members 612 to provide the vibratory energy. While this embodiment illustrates the use of two motorized vibrator assemblies 16C, a single motorized vibrator assembly 16C may be used. In all embodiments, one, two, or more vibrator assemblies 16C can be used.

Further, in the embodiment shown in FIG. 19, the pan assembly 6C includes a continuous series of steps 36C. The number of step 36C can vary depending upon the food product being coated. In the exemplary embodiment shown in FIG. 19 there are six steps 36C. In addition, the vibrator assemblies 16C are mounted to impart energy to the vibratory frame side members 14C at an angle $\beta$ below x-axis 13C. In one embodiment, this angle can be about 22.5 degrees, although other angles, such as about 45 degrees, have been contemplated. Further, the spring assemblies 18C are mounted at an angle $\theta$ below the x-axis 13C that, in at least one embodiment, is substantially equal to $\beta$.

In use, coating is provided to a feed hopper 94C as discussed below. The feed hopper 94C distributes the coating onto a loading surface 88C of a metered conveyor 106C. The metered conveyor 106C is also used to distribute the food product to a loading plateau 58C situated on the uppermost step 36C of the pan assembly 6C. Food product is deposited from the metered conveyor 106C onto the loading plateau 58C. The vibrational forces imparted on the pan assembly 6C move the food product forward along the uppermost step 36C. When food product travels to the end of the uppermost step 36C, it falls onto the next step 36C, that is, the next surface of the pan assembly 6C. Coating that has not adhered to the food product also moves along the steps 36C and coats the food product as both travel along the steps 36C. When the coated food product reaches the end of the pan assembly 6C, it is discharged onto another device, such as a discharge conveyor (not shown). The coating that has traveled along the pan assembly 6C that does not adhere to the food product is also discharged. The discharged coating can be removed as waste or it can be recycled using a coating recycle assembly 200C that includes a recycle conveyor 210C. The discharged coating is dropped into the recycle conveyor 210C directly or through a filter component, such as a scalping screen (not shown), and the recycle conveyor 210C transports the coating to the feed hopper 94C. A channel opening (not shown) in the recycle conveyor 210C allows coating to be discharged from the recycle conveyor 210C into the feed hopper 94C. In addition, in at least one embodiment, the recycle conveyor 210C can deposit coating directly onto the loading surface 88C thereby eliminating the feed hopper 94C as discussed above.

In an exemplary embodiment and as discussed above, the apparatus 2 can apply coatings and toppings including but not limited to, flour, breading, sugar, cheese and spices, to food products, such as pizzas, vegetables, fruits, durable and fragile meat products, and confections. Additionally, in other embodiments, the apparatus 2 can be suitable for applying various consistency coatings and toppings to various food products. Further, although an exemplary apparatus 2 has been described above with respect to coating food products, it has been contemplated that in other embodiments the apparatus 2 can be used with non-food products as well, for example, applying non-food particulates of varying size to the outside of a non-food product, for example, applying glitter to an ornament.

The components and sub-components of the aforementioned apparatuses 2 can be formed from metal, such as stainless steel, although it has been contemplated that other materials may be used such as plastic or mild steel with a protective coating. Further, the apparatuses 2 can be configured to be wider or narrower to accommodate space constraints and food production capacity requirements. Additionally, the numerical ranges in this disclosure are approximate, and thus may include values outside of the range unless otherwise indicated.

In addition, all of the hydraulic and electronic components discussed herein can be controlled by a programmable device such as a programmable logic controller (PLC) or can be provided with various manual or automatic discreet controls, for example hand operated starters and drive controllers.

While this invention has been described in conjunction with the exemplary embodiments outlined above, various alternatives, modifications, variations, improvements, and/or substantial equivalents, whether known or that are or may be presently unforeseen, may become apparent to those having at least an ordinary skill in the art. Accordingly, the exemplary embodiments of the invention as set forth above are intended to be illustrative, not limiting. Various changes may be made without departing from the spirit and scope of the invention. Therefore, the invention is intended to embrace all known or earlier developed alternatives, modifications variations, improvements and/or substantial equivalents. It is specifically intended that the present invention not be limited to the embodiments and illustrations contained herein, but include modified forms of those embodiments including portions of the embodiments and combinations of elements of different embodiments as come within the scope of the following claims.

We claim:

1. An apparatus for applying coating to products comprising:
   a vibration generating portion, for providing a vibratory motion, and
   a product coating portion, for receiving the vibratory motion and applying a coating to a product;
   wherein, the vibration generating portion comprises a vibratory frame assembly that includes a motor vibration assembly, and the product coating portion includes a pan assembly, wherein the vibratory frame assembly is in communication with the pan assembly by spring assemblies that move the pan assembly with a vibratory motion; and wherein the pan assembly includes at least one of a coating application portion, a sifting portion, and an aligning portion; and wherein when included, the coating application portion further comprises one or more steps to guide the coating and the product upwards and forwardly, while simultaneously allowing the product to be vibrated against the coating resting on the one or more steps; and wherein when included, the sifting portion succeeds the coating application portion, if included, and the product continues to vibrate across the one or more steps of which slots are formed therein, and where excess coating flows through the slots.

2. The apparatus of claim 1 further including, a recycle conveyor for collecting the coating that does not adhere to the product and returning the coating to the product coating portion for application to other products.

3. The apparatus of claim 1 wherein the coating that passes through the slots is collected and guided into at least one of a hopper and a recycle conveyor that conveys the coating back to the coating application portion.

4. The apparatus of claim 3 wherein the aligning portion further comprises a corrugated surface situated at an incline having tray channels formed by the corrugations that are substantially parallel with the length of the pan assembly, the tray channels being situated to bias the product such that it can be elongated and aligned from the vibrations.

5. The apparatus of claim 4 wherein an additional sifting portion can be provided that comprises another aligning portion having holes situated there-through to allow agglomerations of coating and fragmented product to pass through, thereby removing them from the process.

6. The apparatus of claim 1 further including a base recycle conveyor and a waterfall recycle conveyor for recycling coating, wherein each conveyor includes a conveyor channel having a lower length, an upper length, an ascending portion and a descending portion, and a looped drag-chain belt having one or more flights situated at least partially in the channel for transporting coating from the lower length to the upper length via the ascending portion, with the lower lengths of at least one channel receiving coating from one end of the apparatus, and the upper lengths releasing coating at another end of the apparatus adjacent to the product coating portion.

7. An apparatus for applying coating to products comprising:
a wire conveyor belt assembly capable of receiving coating and food products and applying the coating to the products,
a pan assembly capable of receiving coating and products and applying the coating to the products, and
a vibration generating portion for providing a vibratory motion to the pan assembly;
wherein the apparatus further includes at least one of a base recycle conveyor and a waterfall recycle conveyor for collecting coating that does not adhere to the product and supplying for application to at least one of a bottom and top portion of a product; and
wherein each conveyor includes a conveyor channel having a lower length, an upper length, an ascending portion and a descending portion, and a looped drag-chain belt having one or more flights situated at least partially in the channel for transporting coating from the lower length to the upper length via the ascending portion, with the lower length of at least one channel receiving coating from a discharge end of the pan assembly, and the upper length of at least one channel releasing coating adjacent an inlet end of the pan assembly.

8. The apparatus of claim 7, wherein the vibration generating portion comprises a vibratory frame assembly that includes a motor vibration assembly in communication with the pan assembly by springs that are capable of moving the pan assembly in a vibratory motion, and a support frame isolated from the vibratory motion.

9. The apparatus of claim 8, wherein the support frame includes a swing frame portion that supports the wire conveyor belt assembly, such that the wire conveyor belt assembly is movable from a non-production position to a production position, wherein the production position allows product to be transported on the wire conveyor belt assembly.

10. The apparatus of claim 9 wherein the pan assembly includes at least one of a coating application portion, a sifting portion, and an aligning portion.

11. The apparatus of claim 10 wherein the coating application portion further comprises one or more steps that utilize the vibratory motion to guide the coating and the product up and over each step, while simultaneously allowing the product to be vibrated against the coating on the step surface.

12. The apparatus of claim 11 wherein the sifting portion succeeds the coating application portion and where the product continues to vibrate across one or more steps of which slots are formed therein, and where excess coating flows through the slots.

13. The apparatus of claim 12 wherein the coating that passes through the slots is collected and guided into at least one of a hopper and the recycle conveyor.

14. The apparatus of claim 13 wherein the aligning portion further comprises a corrugated surface situated at an incline having tray channels formed by the corrugations that are substantially parallel with the length of the pan assembly, the tray channels being situated to bias the product such that it can be elongated and aligned from the vibrations.

15. The apparatus of claim 14 wherein an additional sifting portion can be provided that comprises another aligning portion having holes situated there-through to allow agglomerations of coating and fragmented product to pass through, thereby allowing them to be removed from the steps.

* * * * *

UNITED STATES PATENT AND TRADEMARK OFFICE
CERTIFICATE OF CORRECTION

| | | |
|---|---|---|
| PATENT NO. | : 8,181,592 B2 | |
| APPLICATION NO. | : 12/271632 | |
| DATED | : May 22, 2012 | |
| INVENTOR(S) | : James Karpinsky et al. | |

It is certified that error appears in the above-identified patent and that said Letters Patent is hereby corrected as shown below:

The columns and line numbers where the errors occur in the issued patent are as follows:

Column 22, line 2 after "supplying", insert --the coating--

Signed and Sealed this
Seventeenth Day of July, 2012

David J. Kappos
*Director of the United States Patent and Trademark Office*